INVENTORS.
DAVID W. KERMODE
DALE W. COX, JR.
BY
P. H. Firsht
ATTORNEY.

Feb. 7, 1967 D. W. KERMODE ETAL 3,303,495

GLIDE SLOPE INDICATING SYSTEM

Filed Oct. 25, 1963 12 Sheets-Sheet 2

INVENTORS.
DAVID W. KERMODE
DALE W. COX, JR.
BY
P. H. Firsht
ATTORNEY.

GLIDE SLOPE INDICATING SYSTEM

Filed Oct. 25, 1963

INVENTORS.
DAVID W. KERMODE
DALE W. COX, JR.
BY
P. H. Firsht
ATTORNEY.

INVENTORS.
DAVID W. KERMODE
DALE W. COX, JR.
BY
P. H. Firsht
ATTORNEY.

GLIDE SLOPE INDICATING SYSTEM

Filed Oct. 25, 1963 12 Sheets-Sheet 5

INVENTORS.
DAVID W. KERMODE
DALE W. COX, JR.
BY
P. H. Firsht
ATTORNEY.

INVENTORS.
DAVID W. KERMODE
DALE W. COX, JR.
BY
P. H. Firsht
ATTORNEY.

INVENTORS.
DAVID W. KERMODE
DALE W. COX, JR.
BY
P. H. Fischer
ATTORNEY.

INVENTORS.
DAVID W. KERMODE
DALE W. COX, JR.
BY
P. H. Firsht
ATTORNEY.

GLIDE SLOPE INDICATING SYSTEM

Filed Oct. 25, 1963 12 Sheets-Sheet 9

INVENTORS.
DAVID W. KERMODE
DALE W. COX, JR.
BY
P. H. Fischer
ATTORNEY.

GLIDE SLOPE INDICATING SYSTEM

Filed Oct. 25, 1963 12 Sheets-Sheet 10

INVENTORS.
DAVID W. KERMODE
DALE W. COX, JR.
BY
O. H. Fischer
ATTORNEY.

GLIDE SLOPE INDICATING SYSTEM

Filed Oct. 25, 1963 12 Sheets-Sheet 11

INVENTORS.
DAVID W. KERMODE
DALE W. COX, JR.

BY

P. H. Firsht

ATTORNEY.

INVENTORS.
DAVID W. KERMODE
DALE W. COX, JR.
BY
P. H. Firsht
ATTORNEY.

3,303,495

GLIDE SLOPE INDICATING SYSTEM

David W. Kermode, China Lake, and Dale W. Cox, Jr., Palos Verdes, Calif., assignors to the United States of America as represented by the Secretary of the Navy Filed Oct. 25, 1963, Ser. No. 319,082
12 Claims. (Cl. 343—6.5)

The invention described herein may be manufactured and used by or for the Government of the United States of America for governmental purposes without the payment of any royalties thereon or therefor.

The present invention relates to an indicator system and more particularly to a system for supplying glide path information to an aircraft pilot in a landing pattern as he approaches an aircraft carrier or landing strip.

A major problem in carrier aviation is that of recovering aircraft during conditions of low visibility. Heretofore, the best procedure available for recovering aircraft under conditions of low ceiling and visibility is a procedure commonly known as CCA (Carrier Controlled Approach), as will hereinafter be more fully described. However, such a procedure requires that a pilot fly at specific altitudes prescribed by local doctrines for various ranges as he approaches a touchdown area. Specific ranges and altitudes, as prescribed by local doctrines, are not uniform from command to command, and may even vary from ship to ship and field to field.

Several attempts have been made to provide automatic landing devices encompassing systems for simplifying approach procedures. However, presently known devices include complex systems and thereby significantly increase aircraft weight and bulk and furthermore, many of the presently operable aircraft are not suitably equipped to utilize known automatic landing system.

The device of the present invention comprises an EGS (Electronic Glide Slope) system which makes use of a commonly provided electronic radar range finder system of known design, often referred to as Tacan, and an electronic altimeter, also of known design, to provide a simplified system which is completely compatible with extending Carrier Air Traffic Control systems.

The purpose of the present invention is to provide a simplified indicator system which utilizes electronic components normally existing in modern aircraft, whereby their combined electrical output may be utilized within an indicator to supply intelligence regarding the aircraft's position relative to a predetermined glide slope approach path, or profile, in order to obviate aircraft approach error commonly introduced through pilot observation and judgment resulting from limited visibility due to prevailing atmospheric and weather conditions.

It is therefore an object of the present invention to provide a simplified electronic instrument landing system.

It is another object of the present invention to provide a simplified landing system in which electronic signals indicating aircraft altitude and range, with respect to a point of touchdown, can be effectively utilized to substantially reduce pilot error in aircraft recovery operations.

It is a further object of the instant invention to provide a simplified electronic system which may be readily incorpated within existing aircraft navigational systems for providing improved landing capabilities under adverse ceiling/visibility conditions.

It is still a further object of the present invention to provide an instrument landing system which provides an aircraft pilot with a visual display for supplying error information regarding deviation from a predetermined glide slope profile as the pilot's aircraft approaches a point of touchdown.

It is yet another object of the present invention to provide an improved system for simplifying existing aircraft recovery procedures.

It is still another object of the present invention to provide a simple electrical circuit which utilizes output signals from conventional navigational systems for providing an aircraft pilot with glide slope error intelligence.

It is still a further object of the present invention to provide a simplified method for determining a vehicle's vertical disposition in space with respect to a predetermined path.

Other objects, advantages and novel features of the invention will become apparent from the following detailed description of the invention when considered in conjunction with the accompanying drawings wherein.

Figure 5:
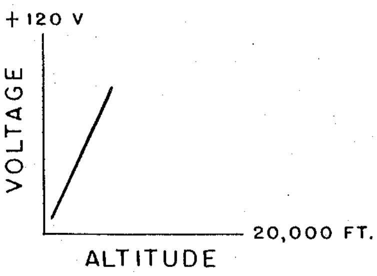
Figure 10:
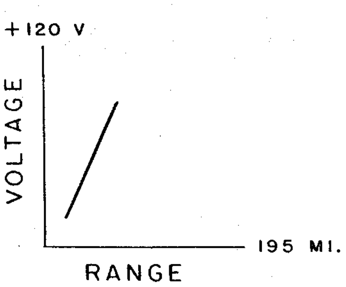
Figure 3A:
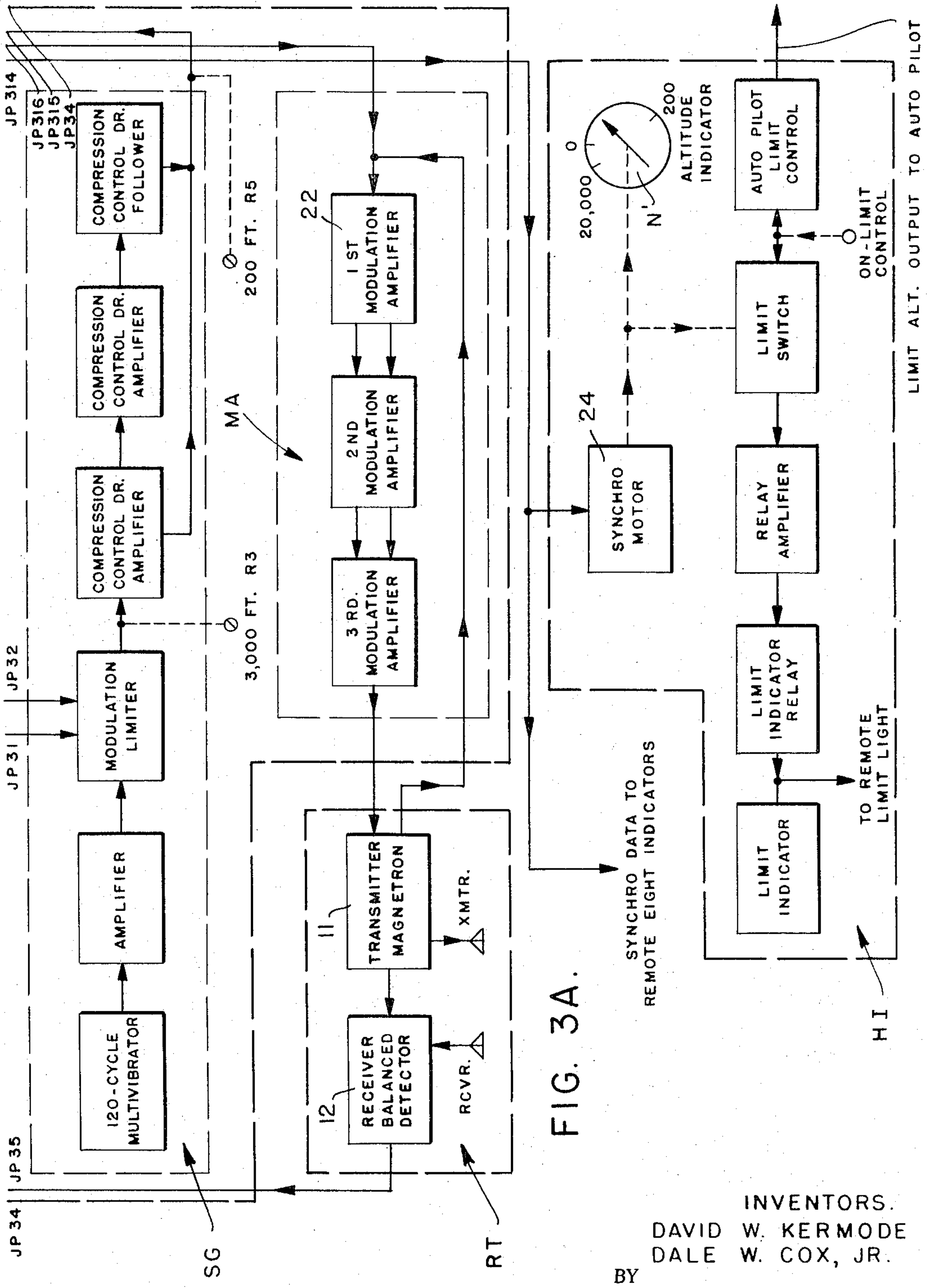
Figure 3B:
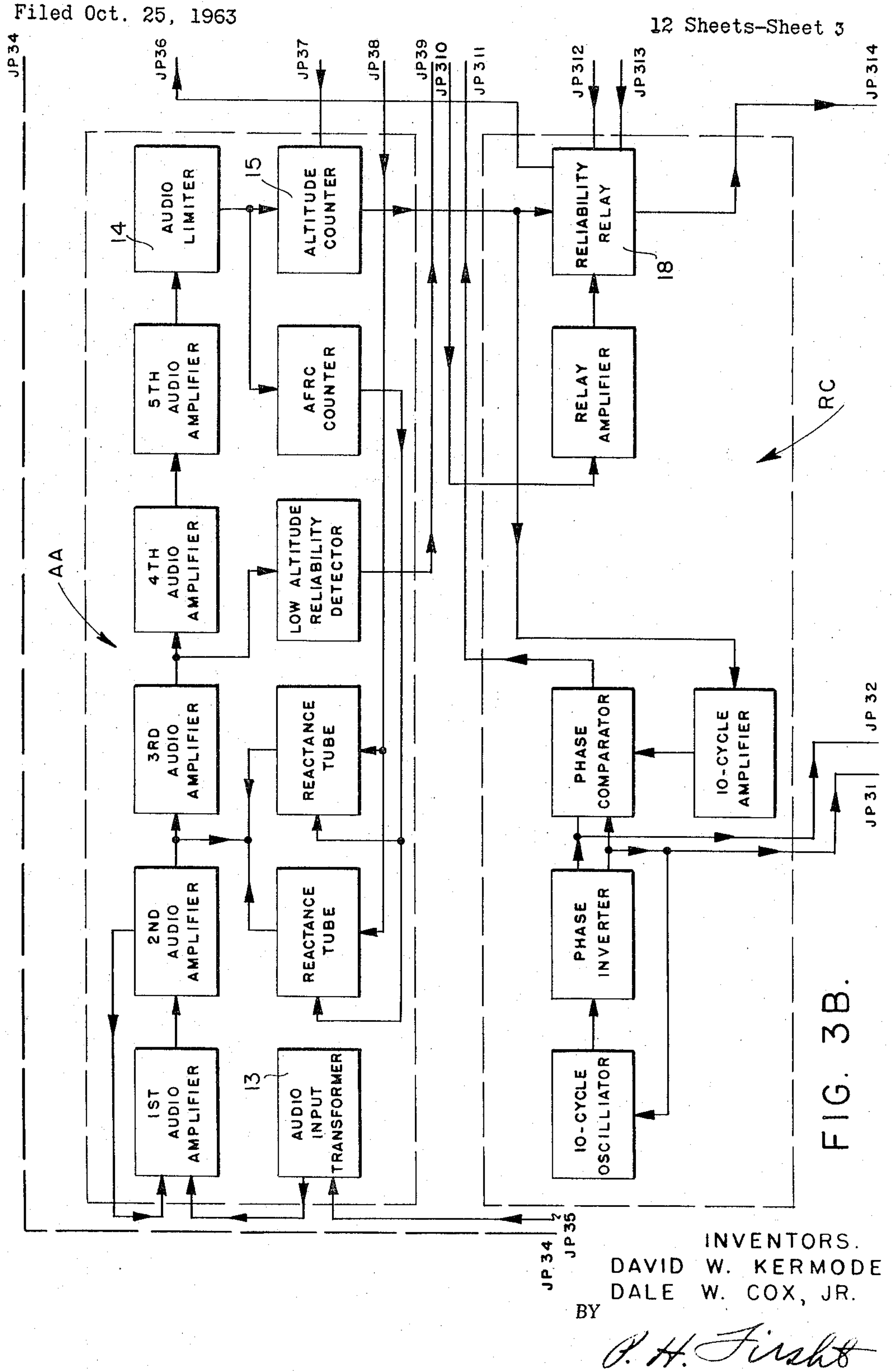
Figure 3C:
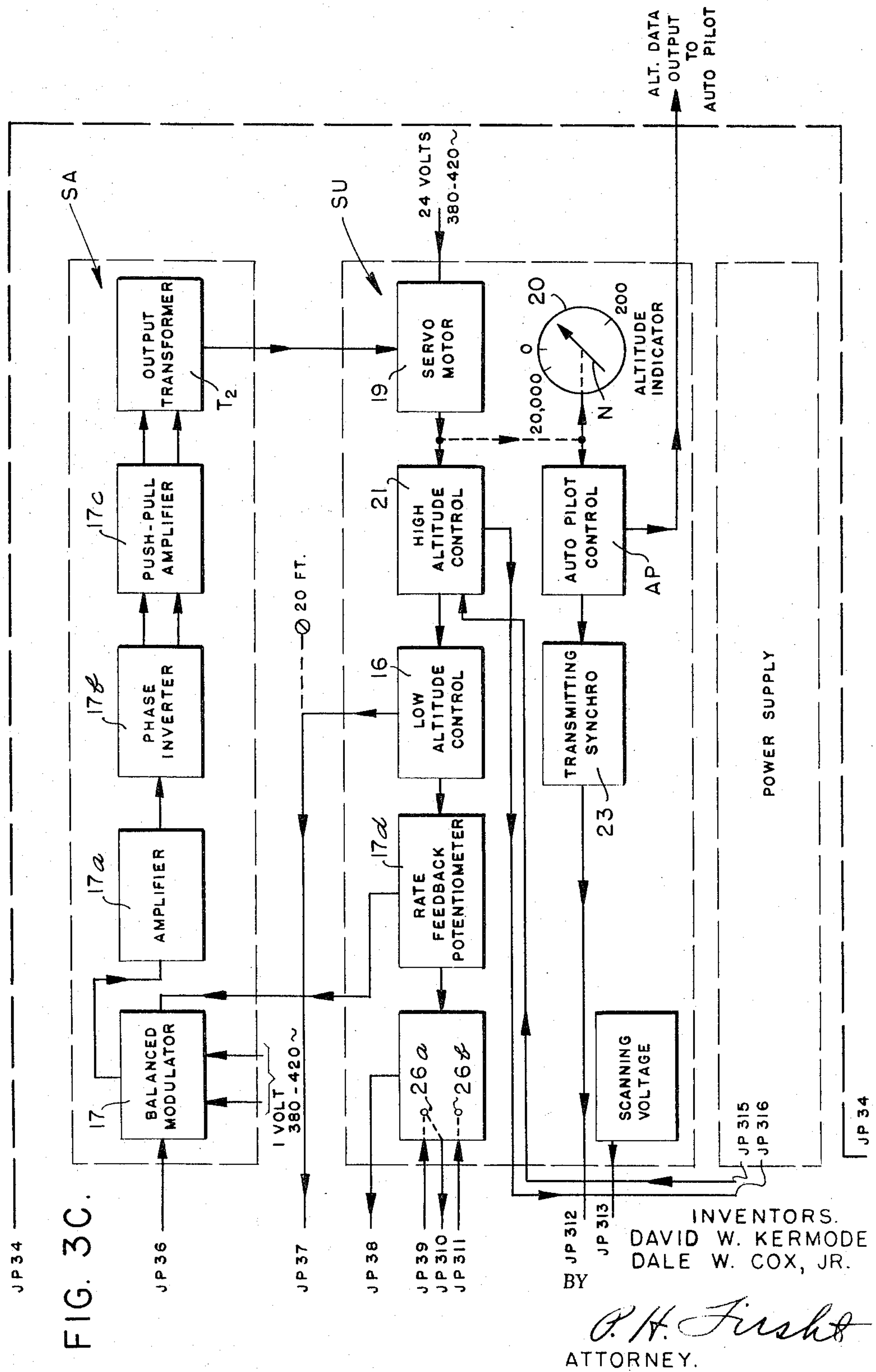
Figure 4A:
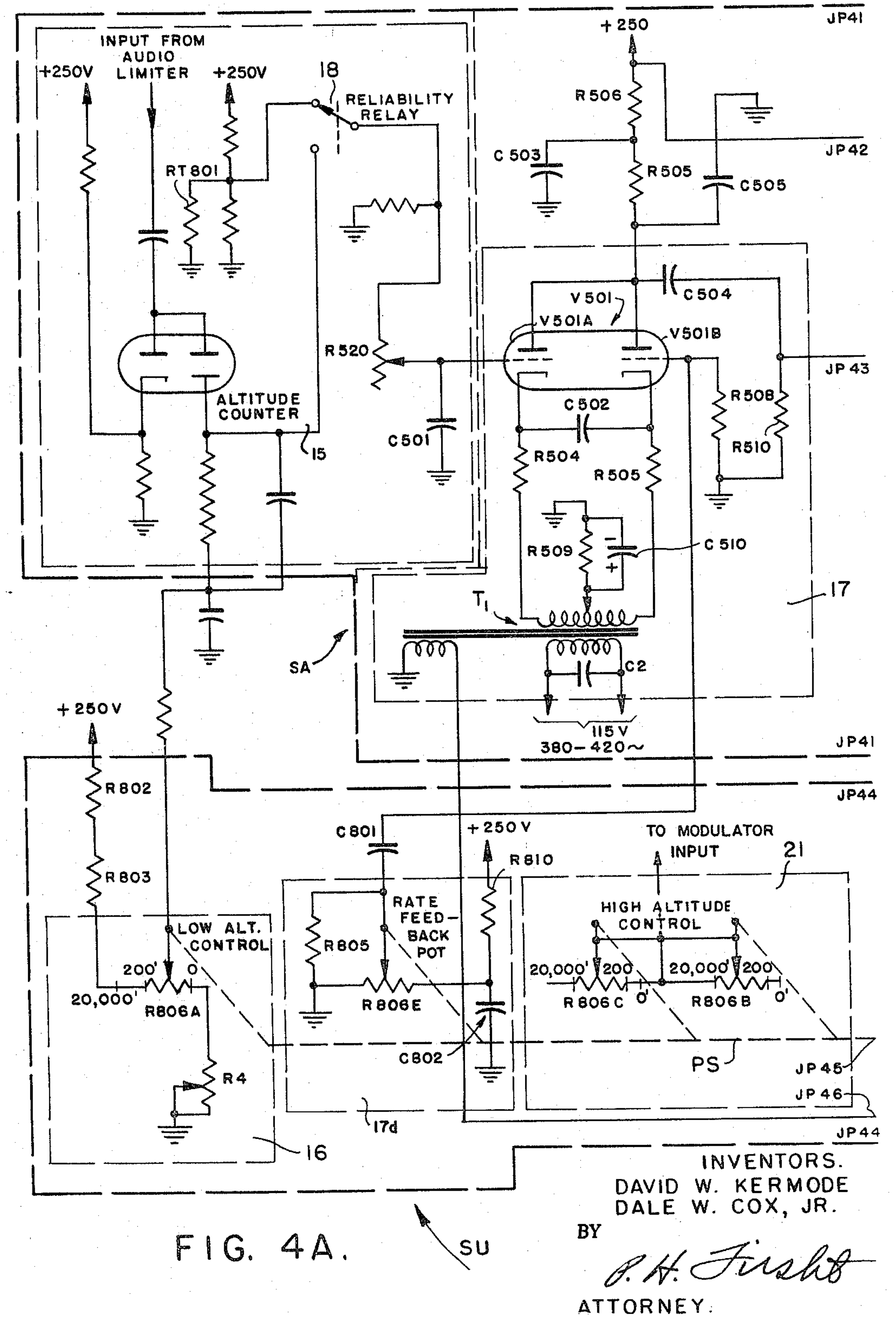
Figure 4B:
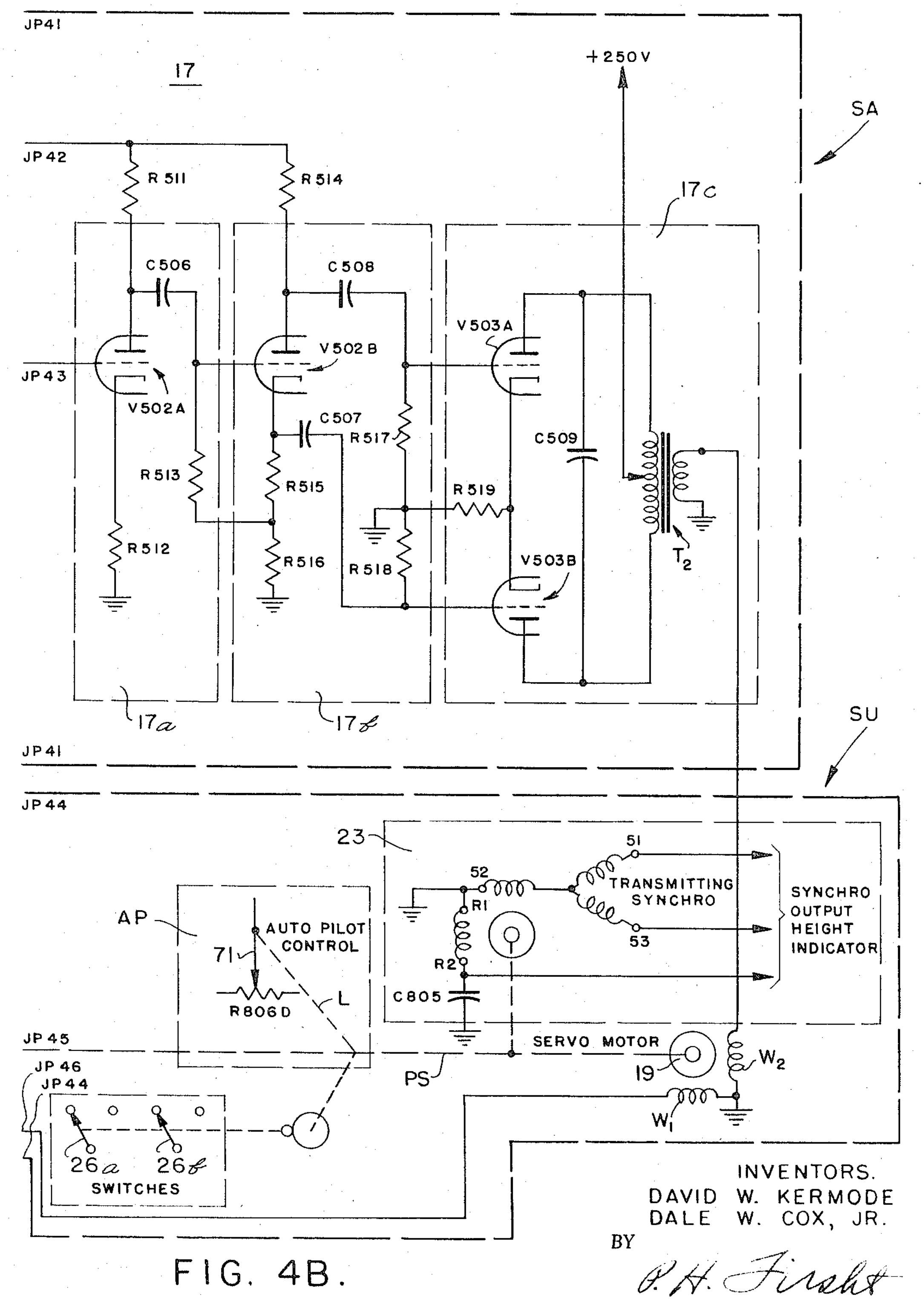
Figure 6:
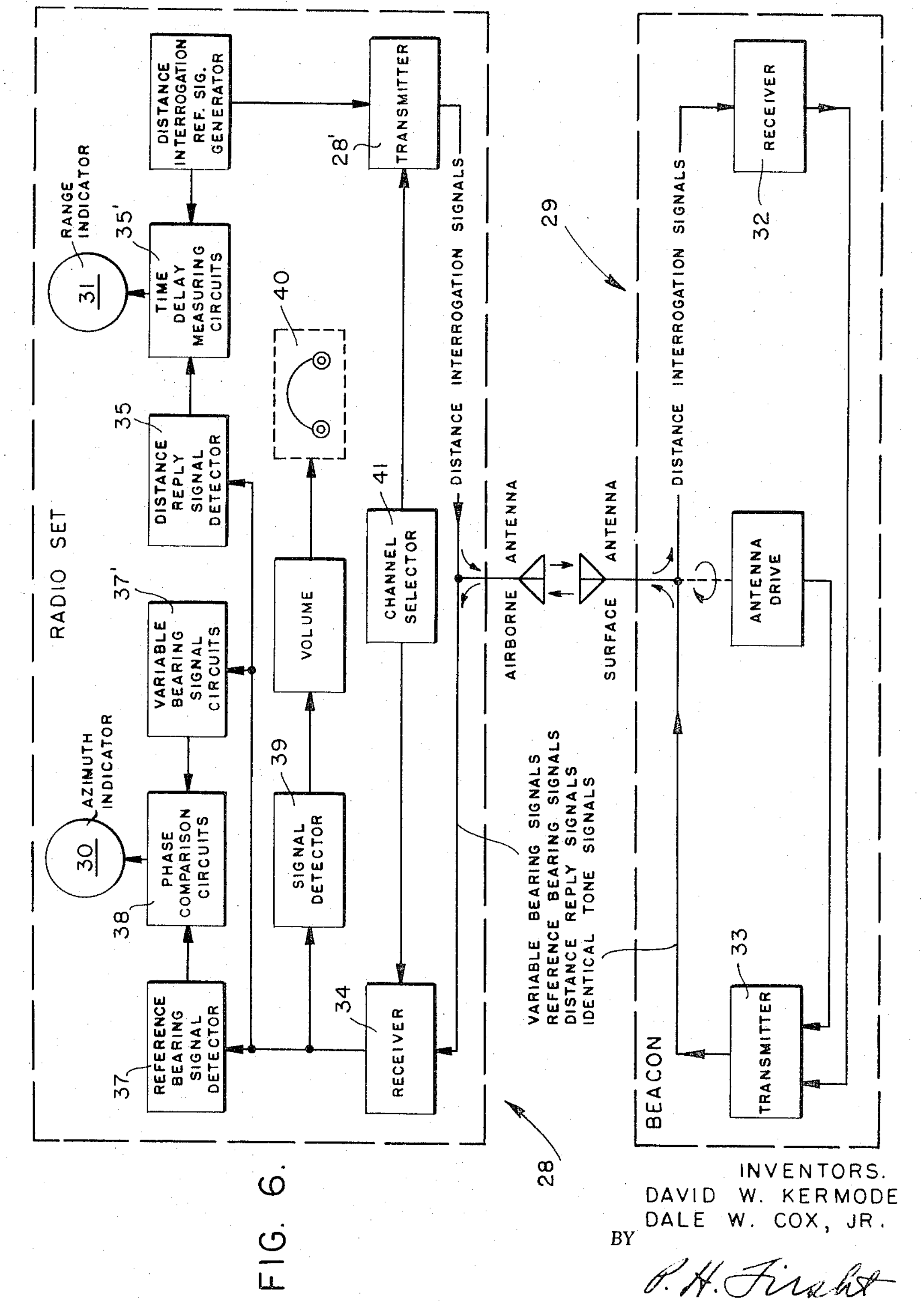
Figure 7:
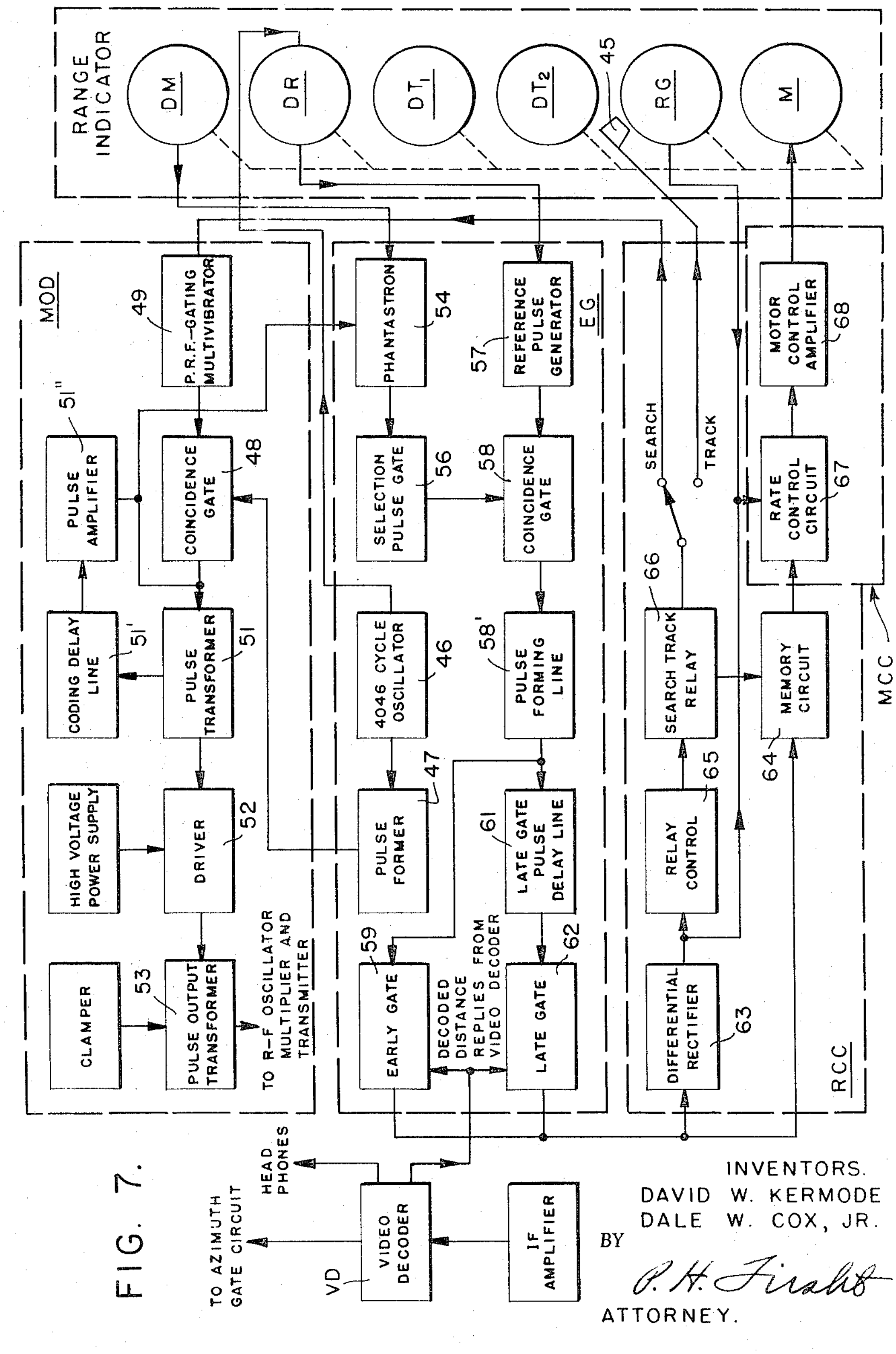
Figures 8, 9:
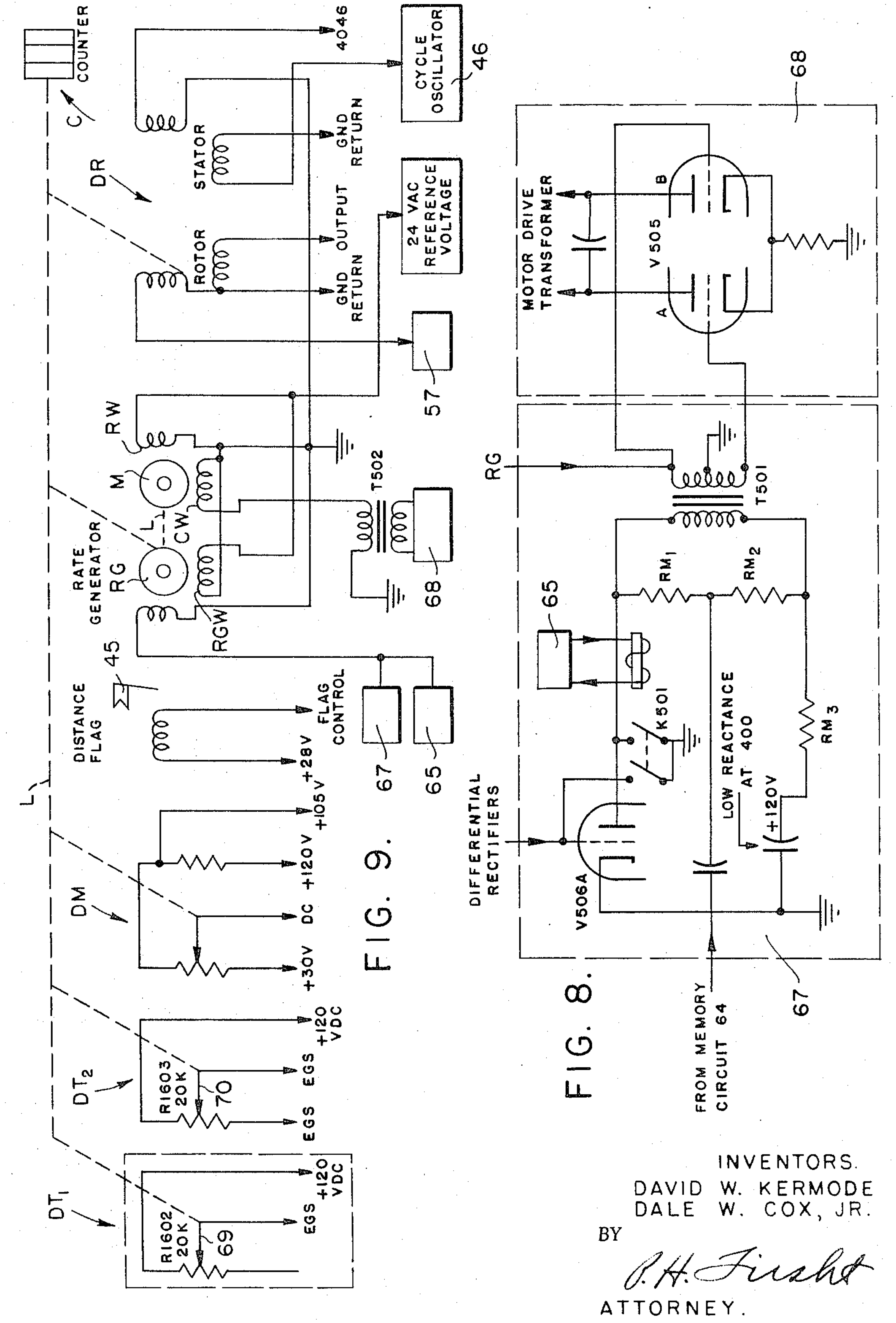
Figure 11:
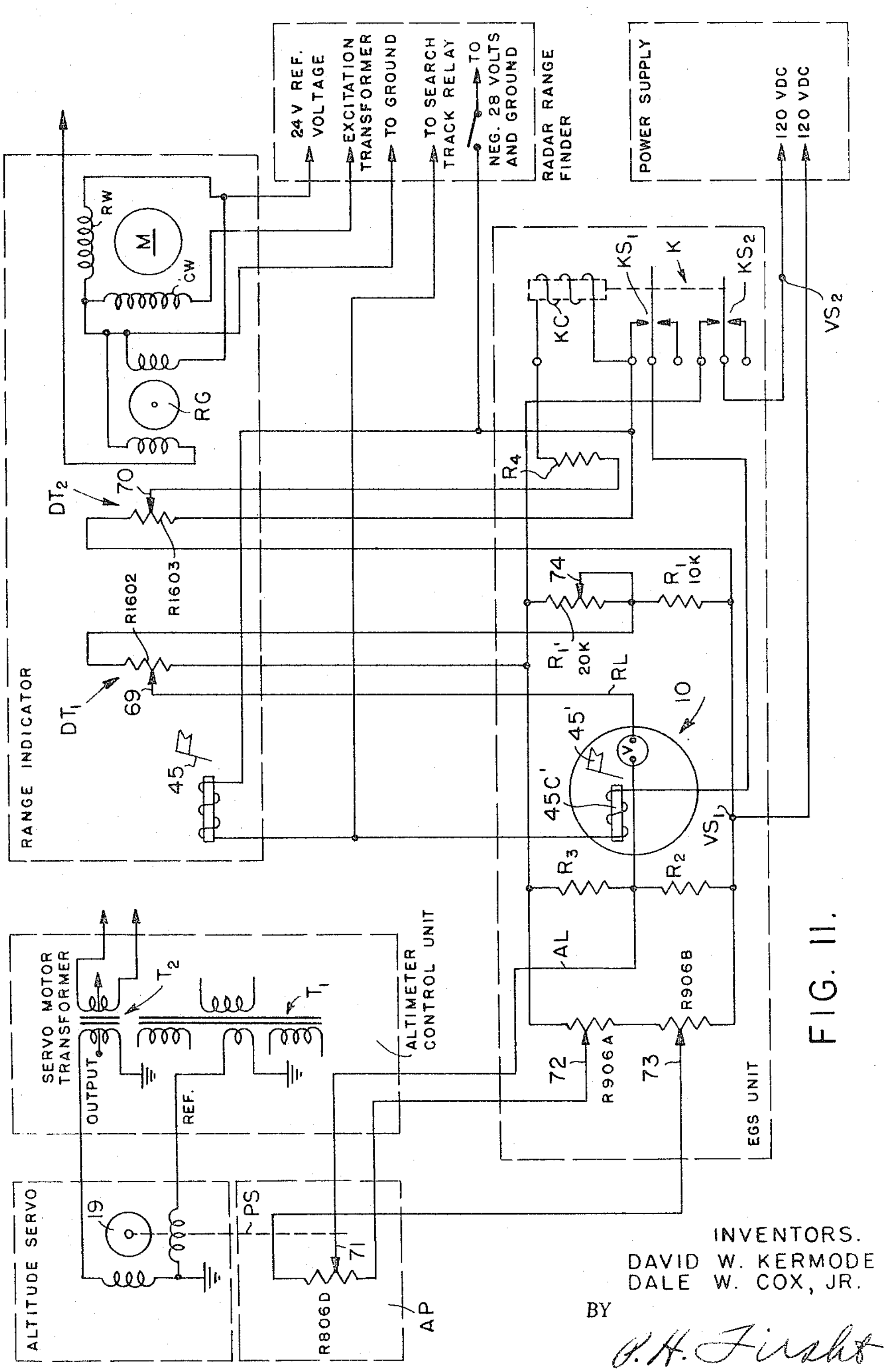
Figure 12:
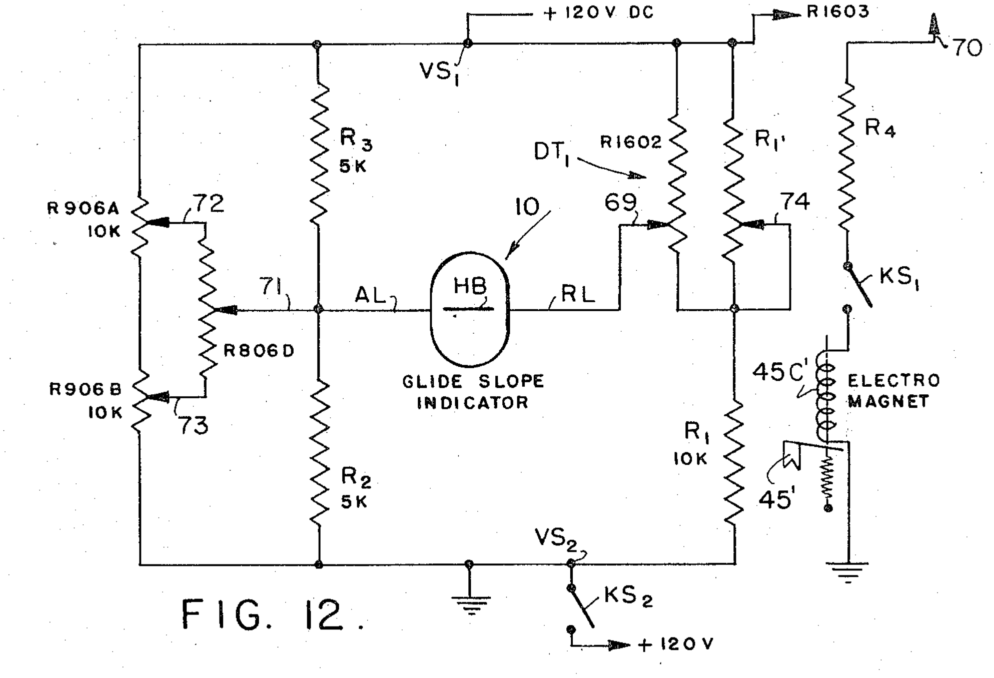
Figure 13:
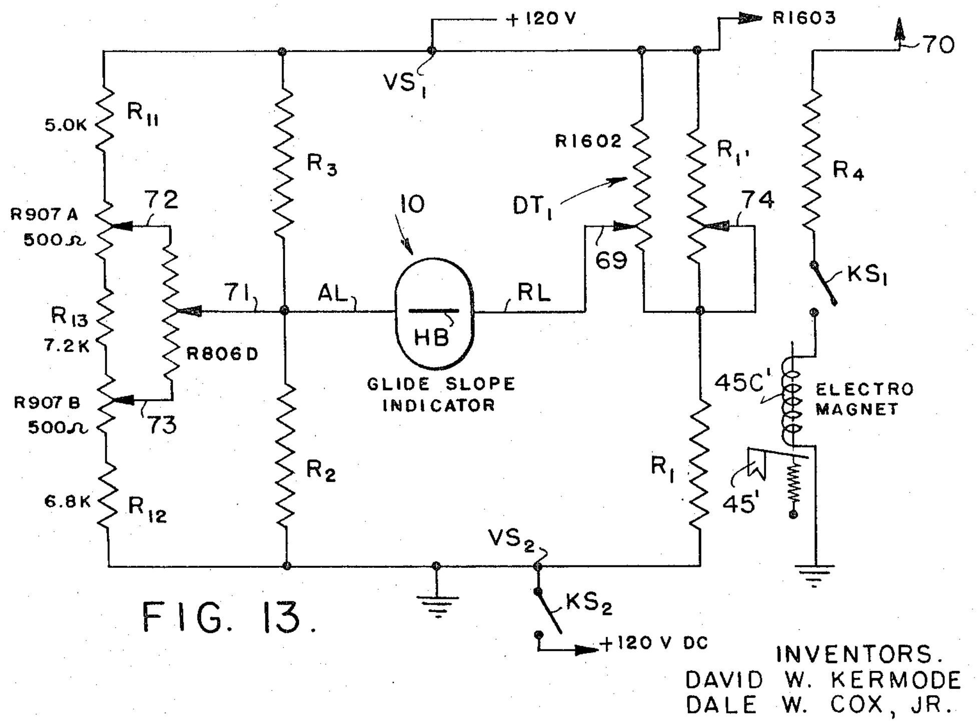
Figure 15:
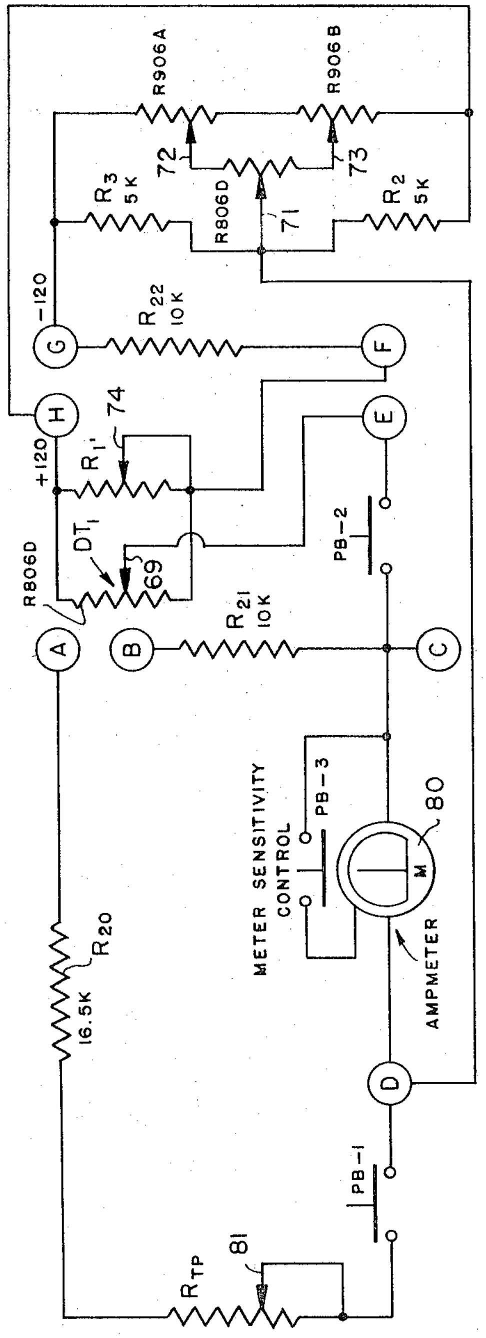
Figure 14:
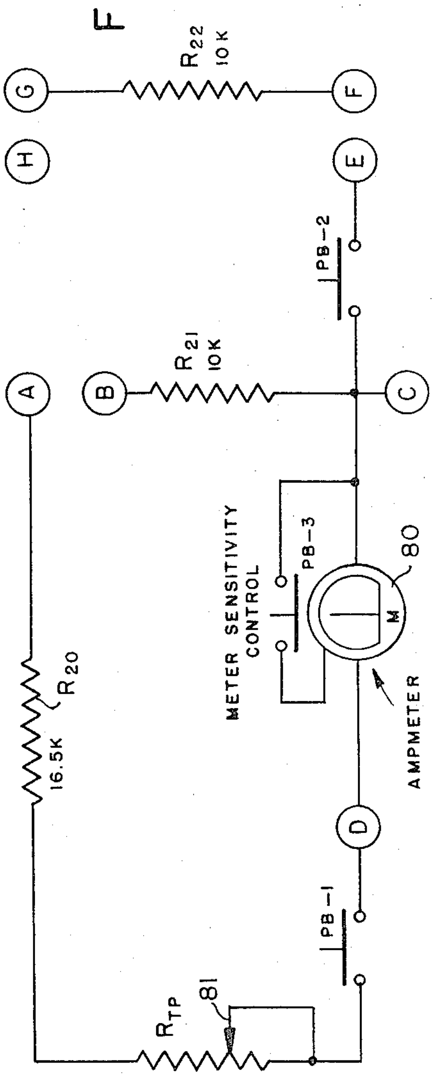

FIGS. 3A, 3B, and 3C collectively constitute a block diagrammatic view of an electronic altimeter of a type which may be utilized for providing altitude intelligence to the Electronic Glide Slope system of the present invention;

FIGS. 4A and 4B collectively constitute a functional diagrammatic view of an amplifier and servo unit as utilized by the altimeter system of FIGS. 3A–3C;

FIG. 5 is a graphic view illustrating a typical voltage output curve obtainable through the altimeter;

FIG. 6 is an overall block diagrammatic view of an electronic range finder system of a type as utilized in the present invention;

FIG. 7 is a partial block diagrammatic view of an electronic range finder system as utilized by the system illustrated in FIG. 6;

FIG. 8 is a functional diagrammatic view of the motor control circuit of the system of FIG. 7;

FIG. 9 comprises a partial functional diagram of the range indicator circuit of the motor control circuit of FIG. 7;

FIG. 10 is a graphic view of a typical voltage output curve obtainable through the range finder system;

FIG. 11 is a partial functional diagrammatic view illustrating an Electronic Glide Slope circuit and portions of an electronic altimeter and a radar range finder unit, as combined in the instant invention;

FIG. 12 comprises a functional diagrammatic view illustrating a bridge circuit arrangement as provided for in the glide slope system of the present invention;

FIG. 13 is a partial diagrammatic view of a modification of the bridge circuit illustrated in FIG. 12;

FIG. 14 is a functional diagrammatic view of a test circuit which may be utilized with the circuit of the present invention for purposes of calibration; and FIG. 15 is a functional diagrammatic view of a test circuit as connected with the circuit of the Electronic Glide Slope system of the present invention.

Figure 1:
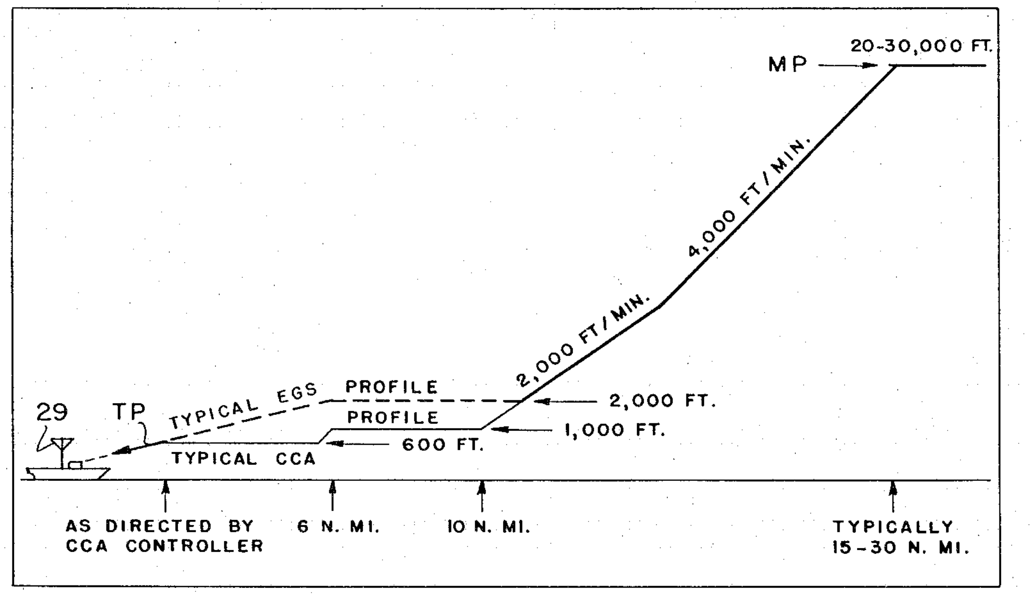
FIG. 1 is a schematic view illustrating typical profiles for Carrier Controlled Approach and Electronic Glide Slope approaches.

Referring now to the drawings, wherein like reference characters designate like or corresponding parts throughout the several views, there is shown in FIG. 1 a pair of typical approach profiles illustrating differences between conventional CCA and EGS approaches. Under CCA procedures, it is necessary for a pilot to fly at several different altitudes as he approaches the ship while communicating with a shipboard radar operator of the ship's Carrier Air Traffic Control Center who vectors the pilot from a marshaling point MP at 20,000–30,000 feet onto a final bearing at which the pilot flys to a selected transition point TP. At the point TP the pilot transitions to a Visual Landing Aid Presentation for making his final approach and touchdown.

Figure 2:
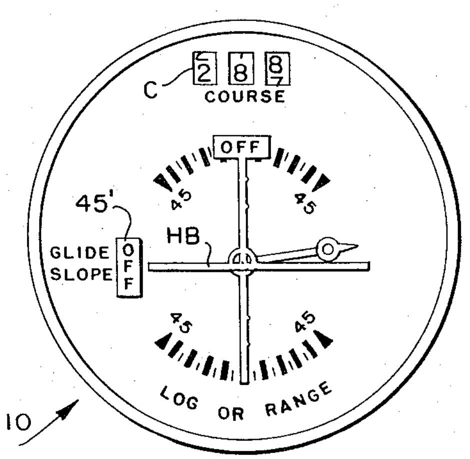
FIG. 2 illustrates a cockpit mounted visual display instrument for indicating aircraft approach error.

When flying an EGS profile, the procedure is significantly simplified in that the pilot merely descends from the marshaling point MP to a relatively safe altitude (1,500–2,000 feet), and then proceeds inbound for a preselected distance and then descends at a preselected angle until a horizontal bar HB of a glide slope indicator, generally designated 10, FIG. 2, indicates that he has intercepted a predetermined glide slope, at which time, he will have attained an altitude of 1,000 feet and a range of 2.77 miles.

When utilizing an EGS system it is not necessary for the Carrier Aircraft Traffic Control Center to provide vectoring information, as is the case when flying a CCA profile, although CCA radar operators can, if desired, monitor all approaches and aid in correcting aircraft lineup when desired.

Upon intercepting the designated glide slope, approximately 2.77 miles from the ship, the pilot flies down the glide slope with the aid of his EGS indicator, in a landing configuration and at proper angle of attack/airspeed. At point TP, or minimum range and altitude, the pilot transfers his attention from his EGS indicator 10 to a Visual Landing Aid Presentation, as in the aforementioned CCA procedure, and completes his landing in normal fashion.

The EGS system of the present invention utilizes output signals from a microwave altimeter, of a type currently installed in most aircraft and which is designed to measure terrain clearance, and an electronic range finder or Tacan.

*Electric altimeter*

The hereinafter described altimeter serves merely as a convenient means for providing an electrical output signal which is proportional to aircraft altitude. It is to be understood that other altitude measuring devices may be utilized for providing an electronic output signal proportional to aircraft altitude in a manner which accommodates the requirements of the EGS system, and which are compatible with the purposes and functions of the present invention. Therefore, only so much of the altimeter presently utilized is described as is deemed sufficient to provide for a complete understanding of the present invention. The specific electronic altimeter of the present invention is described in detail in NavWeps 16–30 APN 22–2, T.O. 12P5–2APN22–2 Handbook Service Instructions Radar Set AN/APN–22 of Aug. 15, 1956, revised July 1, 1962.

Attention is directed primarily to FIGS. 3A, 3B, and 3C, connected at connecting or joining points $JP_{31}$–$JP_{316}$, which collectively constitute a block diagram of an electronic altimeter of the type presently utilized in the present invention. Beginning with the radar transmitter unit RT, FIG. 3A, it is to be understood that a frequency modulated signal is generated and simultaneously delivered through a transmitter magnatron 11 to both a transmitter antenna and a receiver balanced detector 12. The transmitter antenna radiates a signal toward the terrain over which an aircraft is flying. This signal is reflected back and received at a receiving antenna, fed to the balanced detector 12, mixed with the frequency modulated signal to provide a heterodyne beat frequency difference output signal, and is then fed to an audio input transformer 13, FIG. 3B, of a five-stage audio amplifier AA. The amplifier AA in turn amplifies the signal to provide an input signal to an audio limiter 14. The limiter 14 is connected at the output of the audio amplifier circuit AA and provides an amplified amplitude limited output signal having an average frequency proportional to the aircraft's altitude. The limiter 14 now provides an output which is applied as on input to an altitude frequency counter 15. The counter 15 establishes an output signal comprising a D.C. (direct current) voltage which is proportional in amplitude to the average frequency of the altimeter output. The output voltage of counter 15 comprises a limiter output voltage mixed with a second D.C. voltage of opposite polarity, or counter bias voltage, which comprises an output voltage from low altitude control system 16, FIG. 3C. The system 16 is provided with a servo motor controlled linear potentiometer R806A, FIG. 4A, functioning to control the voltage value of the D.C. voltage fed to the counter 15.

The output signal from the counter 15 is now fed to a balanced modulator 17, FIG. 3C, through a reliability relay 18 of a reliability circuit RC, FIG. 3B. The modulator 17 serves as an input unit for a servo amplifier circuit SA, which has disposed therein an amplifier 17*a*, a phase inverter 17*b*, and a push-pull amplifier 17*c* to modulate and amplify the input signal and provide a servo amplifier output signal as an input signal for activating a potentiometer driving servo motor 19 arranged within a servo system SU, FIG. 3C.

Unless the output signal from the counter 15 is reduced to zero or canceled, by the second D.C. or counter bias output signal from the low altitude control system, the servo motor 19 will be activated by the servo amplifier output signal, whereupon the servo motor 19 functions to drive a potentiometer shaft PS connected with the arm of the potentiometer R806A, FIG. 4A, in a direction which affords cancellation of the output signal from the counter 15 until such time as the signal is canceled, or, in other words, when no aircraft altitude increase is experienced.

Concurrently with the driving of the arm of potentiometer R806A, the servo motor 19 additionally serves to position an indicator pointer N, FIG. 3C, disposed in a conventional visual display indicator 20 which serves as a pilot aid. It is to be understood that the low altitude control system 16 serves to vary the counter bias voltage linearly from a minimum, at zero altitude, to a maximum at 200 feet. The transmitter FM (frequency modulated) sweep width is made constant over the range of 0–200 feet, therefore, the output voltage of counter 15 will rise from a minimum at zero altitude to a maximum at 200 feet. Hence, the servo amplifier SA serves to automatically position an indicator pointer N through the servo motor 19, by adjusting the bias voltage so as to just cancel the output voltage of counter 15.

Above 200 feet the counter bias output voltage from the low altitude control unit 16 is kept constant at its maximum amplitude while a high altitude control unit 21 serves to vary the transmitter sweep width keeping the heterodyne beat frequency, and hence the output voltage, of the counter 15 constant up to 20,000 feet.

The FM sweep voltage for the magnatron 11 is developed in a sweep generator SG, FIG. 3A. The sweep voltage or output of the sweep generator SG is fed through servo motor driven high altitude control potentiometers R806B and R806C, FIG. 4A, disposed in the high altitude control unit 21, FIG. 3C, to a first modulation amplifier section 22, FIG. 3A, of a modulator amplifier circuit MA. This signal is amplified in the modulator amplifier circuit and applied to the FM reed of the magnatron 11 in order to frequency-modulate the magnatron's output signal. The high altitude control potentiometers of the high altitude control unit 21 are arranged within the servo system SU and serve to compress the amplitude of the output voltage of the sweep generator SG over a 100 to one range. This causes the magnatron FM sweep to change by a factor of 100 to one, which as a practical matter, is the change required in going from 200 feet to 20,000 feet.

The reliability circuit RC provides a measure of the received signal strength by measuring the system signal noise ratio, irrespective of the actual system noise level, whenever the altitude is greater than 150 feet, and by measuring the sum of the received signal and noise level when the altitude is less than 150 feet. The output of the reliability circuit actuates the aforementioned reliability relay 17 in a manner such that when the relay 17 is de-energized it functions to disconnect a height indicator HI, FIG. 3A, from the servo system and gives the aircraft pilot a visual warning that the received signal is too weak to provide reliable system operations.

When unreliable conditions exist, the reliability relay 17 also serves to disconnect the servo amplifier SA from the counter 15 and connects it to a fixed error signal, as will hereinafter be more fully explained. This causes the servo system SU to search continuously through its entire range until it finds a true received signal of sufficient strength to provide for reliable system operation. The reliability circuit RC automatically restores normal system operation as soon as the servo system SU locates a true received signal of reliable strength.

Over an altitude range of zero to 200 feet the heterodyne beat frequency is permitted to vary to provide a measure of altitude. Each time aircraft altitude is doubled, the heterodyne beat frequency is doubled, and the received signal strength is reduced by six decibels. Therefore, in order to provide a constant heterodyne beat frequency signal level at the grid of the audio limiter 14 over the altitude range of zero to 200 feet, and to improve the system signal-to-noise ratio in flying above 200 feet, an audio amplifier response characteristic, which rises at the rate of six decibels per octave over the frequency range involved going from zero to 200 feet, is employed.

However, at very low altitudes, where the heterodyne beat frequencies signal comprises a low frequency, Doppler and other extraneous signals may be encountered. Extraneous signals, other than Doppler, might be higher in frequency than the desired altitude signal and be the cause of the sloped gain characteristics of the audio amplifier which could be amplified more than the desired altitude signal. Such would cause the undesired signals to mask the desired signal at very low altitude under certain conditions, producing an error in the indicated altitude. However, as a practical matter, this condition will normally occur only while taxiing the aircraft at ground level.

It is to be noted that while the composite block diagram of FIGS. 3A, 3B, and 3C include a major portion of an electronic altimeter of the type utilized by the present invention, only so much of the altimeter is herein described in detail as is deemed necessary to provide an understanding of the unit as it is related to the EGS system of the present invention.

However, it is to be understood that the electronic altimeter servo system includes a servo amplifier and a two phase servo motor 19 which drives a transmitter synchron and the aforementioned potentiometers R806A, R806B, and R806C. Output signals of the altitude counter 15 in the audio amplifier are applied to the input of the servo amplifier SA as a negative D.C. voltage, which rises from a minimum at zero altitude to a maximum at 200 feet. Below 200 feet the aforementioned potentiometer section 806A, FIG. 4A, of the low altitude control unit 16, is driven by the servo motor 19, and functions to feed back an invariable positive bucking voltage to the counter 15 to cancel the output voltage thereof. Whenever this bucking voltage equals the output voltage of the counter 15, there is no input applied to the servo amplifier SA and the servo motor 19 does not operate. But when the counter output and bucking voltages are not equal, an input signal, which is proportional in amplitude and polarity to the amount and direction of the difference between the two voltages, is applied to the balanced modulator 17. This causes the servo motor 19 to operate until it has reduced the error signal to zero. The position of the potentiometer arm of potentiometer R806A is therefore an indication of aircraft altitude. As the potentiometer R806A comprises a linear potentiometer, the position of its arm will change linearly with aircraft altitude over a range of zero to 200 feet.

Above 200 feet the bucking voltage of the low altitude control unit 20 is held constant and the potentiometers R806B and R806C, of the high altitude control unit 21, serve to vary the FM sweep to hold the counter output voltage equal to the bucking voltage. Since a transmitter FM sweep width can, under these conditions, be used as an indication of altitude, the position of potentiometer shaft PS is still indicative of aircraft altitude. The potentiometers R806B and R806C are arranged in the circuit in such a manner that decreasing amounts of potentiometer arm displacement are required to produce a given amount of FM sweep with reduction as altitude increases. Therefore, by using the position of potentiometer shaft as an indication of altitude, the display will be linear over the range of zero to 200 feet and compressed above 200 feet. The amount of compression has been set up so that potentiometer shaft PS advances as a function of one over the altitude squared above 200 feet. A total potentiometer shaft rotation of 311° is used to cover the range of zero to 20,000 feet with the first 120° covering a range of zero to 200 feet.

The change over of the two modes of operation at 200 feet is made automatically without the use of switches or relays by using specially constructed potentiometers. The low altitude control potentiometer 806A is so wound that the resistance from its arm to one end thereof rises linearly during zero to 120° potentiometer shaft rotation and then remains constant for any increased rotation. The two high altitude controlled potentiometers R806B and R806C are wound so that the resistance to their arms is constant during zero to 120° shaft rotation and then changes linearly for further rotation up to the point which would be equivalent to an altitude of 20,000 feet.

The altitude indicator pointer N on the panel of the electronic controlled amplifier and the transmitting synchronizing unit 23 are driven directly from the potentiometer shaft PS. The output of the unit 23 is applied to the synchronizing motor 24 in the height indicator HI, causing its pointer N′ to follow the potentiometer shaft.

In order to provide a clear understanding of the operation of the servo amplifier SA and the servo unit SU, a more detailed description thereof is hereinafter included. Attention is directed particularly to FIGS. 4A and 4B, connected at points $JP_{41}$–$JP_{46}$ wherein is shown, in functional diagrammatic form, the servo amplifier SA and the servo unit SU. As aforedescribed, the servo amplifier SA has arranged therein the aforementioned balanced modulator 17, and the amplifier 17*a*, the phase-inverter 17*b*, and an output push-pull amplifier 17*c*.

The balanced modulator 17 consists of a dual triode V501 and is used to convert the direct current output from the counter 15 to a 400 cycle alternating current signal that is proportional in amplitude and phase to the amplitude and polarity of the counter output voltage for operating an A.C. (alternating current) circuit servo system to control the position of the aforementioned indicator pointers N and N′.

The dual triode V501 of the modulator 17 comprises two sections, V501A and V501B, which are arranged with their grid and cathode circuits connected in a push-pull fashion and with their plates connected in parallel. Approximately one volt of 400 cycle alternating current, obtained from the secondary of a transformer $T_1$, is applied to the two cathodes and the push-pull configuration through resistor R504 and R505. When the modulator 17 is balanced, i.e., when both sections are biased so that they can readily conduct, the 400 cycle voltage developed in the plate circuit, due to the alternating current input applied to the cathode of the V501A, may be canceled by the alternating current voltage developed in the plate circuit, due to the alternating current input applied to the cathode of V501B, hence, there will be no modulator output. Equal amounts of cathode bias are applied to the tube sections V501A and V501B through the resistors R504, and R505, and a common cathode resistor R509 so that the circuit will be in its balanced condition with a zero input voltage.

When a D.C. error signal is applied to the grid of V501A, at the input of the modulator 17, the signal unbalances the modulator and causes it to produce an A.C. (alternating current) output. This is caused by the error voltage changing the bias on the V501A so that the two tube sections V501A and V501B will conduct unequally in response to A.C. excitation as applied to their cathodes. When the error voltage of counter 15 is positive (the indicated altitude is higher than the actual altitude), the bias on the section 501A is decreased causing it to conduct more than the section V501B. This unbalances the modulator 17 and causes an A.C. ripple voltage to be developed in the plate circuit, the predominating phase of which is descriptive of the A.C. voltage applied to one of the triode V501 cathodes. When the error voltage of counter 15 is negative (the indicated altitude is lower than the actual altitude), it increases the bias on the section V501A causing it to conduct less than section V501B. This unbalances the modulator 17 in an opposite direction and causes an A.C. ripple voltage to develop in the plate circuit, the predominating phase of which is descriptive of the A.C. voltage applied to the other triode V501 cathode and which is therefore 180° out of phase with that developed by the positive error signal.

Amplitude of the A.C. voltage developed in the modulator plate circuit is proportional to the amplitude of the applied error signal up to the point where limiting occurs. Limiting occurs for a positive error signal when the error voltage is high enough to drive the triode section V501A into grid current, and for negative error signal when the error is large enough to drive the section V501A to cutoff.

The servo motor 19 comprises a two-phase servo motor having a pair of windings, i.e., excitation winding $W_1$ and control winding $W_2$, FIG. 4B. The winding $W_1$ of the two-phase servo motor is continuously excited from a winding on the transformer $T_1$ and the phase of the A.C. voltage applied to the cathodes of the modulator 17 is shifted 90° by a capacitor C502, the resistors R504 and R505. Therefore, the A.C. voltage developed in the modulator plate circuit will either be 90° or 270° out of phase with respect to motor excitation, depending on error signal polarity. The A.C. voltage developed in the modulator plate circuit is amplified by a resistance coupled amplifier stage triode V502A, FIG. 4B, of amplifier unit *17a* and is fed through a capacitor C506 to the grid of a triode V502B disposed in the phase inverter *17b*. The tube V502B has its plate load resistance divided equally between its plate and the cathode circuits and is used as a split load phase inverter, producing two output voltages that are equal in amplitude and opposite in phase.

The two output signals of V502B are fed through capacitors C507 and C508 to the push-pull amplifier *17c*, and particularly to the grids of a pair of push-pull output amplifier sections V503A and V503B. The outputs of sections V503A and V503B are fed through a servo output transformer $T_2$ to the control winding $W_2$ of the servo motor 19. The primary winding of the transformer $T_2$ is resonated at 400 cycles per second by a capacitor C509 to increase the effective gain of the amplifier system. The voltage applied to the control winding $W_2$ of motor 19 will be either 90° or 270° out of phase with respect to the voltage applied to the excitation winding $W_1$, depending on the polarity of the error signal, and will cause the servo motor 19 to turn in accordance therewith.

The servo system SU has been set up so that the A.C. voltage produced by a positive error signal, from the counter 15 will cause the motor 19 to turn in a direction that decreases the indicated altitude, and a negative error signal from the counter 15 will cause the motor 19 to turn in a direction that produces an increase in the indicated altitude.

To make the servo amplifier SA compensate for very small error voltages, for thereby obtaining a minimum servo system dead space, it is necessary that a high gain servo amplifier be used. However, high gain servo amplifiers are usually unstable in that they tend to oscillate about a null point rather than actually coming to rest, or they will saturate when a moderate signal is impressed. For this reason provisions have been made to set the gain of the servo amplifier SA at its best operating point. An RC filter, comprising a resistor R520 and a capacitor C501, FIG. 4A, is included in the servo amplifier SA to maintain the ripple voltage level at a value which is just below a value which the amplifier *17a* to oscillate and below the value which will saturate the amplifier. In addition to this, a negative feedback loop is provided around the servo system to prevent saturation of the amplifier at high signal levels.

The feedback loop is used to reduce the gain of the amplifier *17a* in proportion to the rate of servo motor rotation. This causes a maximum servo amplifier gain to be available when there is no error signal for permitting the servo motor 19 to develop a high starting torque from a small error signal. It then reduces the gain of the amplifier *17a* by an amount that is proportional to the speed of the motor as soon as the motor starts running. In addition, it also serves to damp out quickly any oscillation that may occur when the motor 19 is started or stopped. This feedback rate is obtained from a servo motor driven potentiometer R806E, arranged in a rate feedback unit *17d*, FIGS. 3C and 4A.

The potentiometer R806E is connected across a 250 volt output of a conventional D.C. power supply unit through a decoupling filter comprising a resistor R810 and a capacitor C802 and arranged so that its arm may be rotated by the servo motor 19. An output from the arm of the potentiometer R806E is fed through a capacitor C801 to the grid of the triode V501B of the balanced modulator 17. The capacitor C801 serves to prevent the D.C. voltage developed at the arm of potentiometer R806E from being applied directly to the grid of V501B of the modulator 17, but permits a voltage to be applied that is proportional in amplitude and polarity to the speed and direction of the servo motor rotation. The polarity of the thus applied voltage is such that it reduces the error voltage output of modulator, thereby, in effect, serving to reduce the gain of the servo amplifier system SA as a function of servo motor speed. Additionally, the potentiometer R806E also supplies a rate feedback voltage as required in a stable operation of the servo system's two-cam operated microswitchs *26a* and *26b*, which are both actuated when an altitude indication passes through approximately 150 feet. In practice, the switch *26a* is used to disable the low altitude circuit when the indicated altitude is above 150 feet, while the other switch *26b* is used to connect the input of the reliability circuit RC, FIG. 3B, to either an output of a low altitude reliability detector or a 10-cycle output of the phase comparator (about 150 feet), illustrated without reference numerals, FIG. 3B, to provide the aforementioned fixed error signal.

A servo motor driven control potentiometer resistor R806D is arranged within an automatic pilot control unit AP, FIGS. 3C and 4B, and functions as a means for transmitting indicated altitude data to an aircraft's automatic pilot device, not shown. It is to be particularly noted that this potentiometer, R806D, provides the necessary means for tying the altimeter with the EGS system of the present invention as more clearly illustrated in FIG. 9. However, at this juncture it is necessary to understand that the resistor of the potentiometer R806D is to be connected across a D.C. voltage source, disposed within an associated aircraft, so that as the aircraft's altitude is varied a potentiometer voltage output change proportional to the aircraft's altitude change will be experienced at the output of the potentiometer arm, as illustrated by the curve of the graph of FIG. 5.

*Range finder*

The hereinafter described range finder system is of a type found desirable for providing a signal input to the EGS systems of the present invention. However, it is to be understood that the type of range finder hereinafter more specifically described is not exclusive, and other electronic range finders may be utilized so long as they are compatible with the purposes and function of the EGS system of the present invention. Therefore, only so much of the range finder system is described in detail as is deemed amply sufficient for providing for a complete understanding of the present invention. The specific range finder of the present invention is described in detail in NavWeps 16–30 ARN21–2, T.O. 12R5–2ARN 21–2; Radio Set AN/ARN–21 of May 1, 1956, revised January 15, 1958.

The present invention, as hereinbefore mentioned utilizes a range finder of known design. The system, generally designated 28, FIG. 6, is designed to selectively operate in conjunction with one of a plurality of surface navigational beacons, generally designated 29.

The airborne system 28 and surface located beacons 29 form a navigation complex, which enables an equipped aircraft to obtain continuous indications of its distance and bearing from any selected surface beacon located within a line-of-sight distance, up to 195 nautical miles. The bearing information and distance information are visually displayed on dials 30 and 31, provided for two separate indicator circuits, which are commonly known as an azimuth and range indicator circuits, respectively.

The airborne system 28 is so designed as to initiate, or radiate, pulsed signals from a transmitter 28' disposed within the airborne system 28. The transmitted signals, known as distance interrogation pulses, are detected at a receiver 32 of a beacon 29. The beacon 29 is then caused to respond with its own transmitted pulses or response signals through a transmitter, designated 33.

The beacon reponse pulses are received by the receiver 34 of the airborne system 28. A distance reply signal detector circuit 35 and a range circuit 35', hereinafter more fully described, measure the lapse of time between transmission of the interrogating pulse and the reception of the beacon response signals or pulses. Other range circuits, also to be later described, then convert the time differential into a meter indication which is displayed on the dial 31 within the range indicator circuit.

In addition to the response signals, the beacon system 29 continuously transmits a series of radio pulse bearing signals. These signals can be received by the airborne system 28 at any time during which the receiver 34 is in operation. These pulsed signals are directed through a reference bearing detector circuits 37, 37', and a comparator circuit 38 and then displayed as a bearing intelligence on the dial 30 of the azimuth indicator circuit to provide the aircraft pilot with bearing data.

The received signals may also be converted to audio signals through a tone indentification signal detector 39 and directed to a headset 40 so that the pilot may hear and identify the received signals.

For distance-measuring purposes, use of the airborne system 28 is dependent upon a satisfactory operation of the beacon 29 at a maximum line-of-sight distance of approximately 195 miles. A wide range of channels to choose from is made possible through a multiple channel selector 41, thus increasing the probability of locating a surface beacon installation. An operator, or pilot, knowing his approximate location is therefore capable of selecting a nearby beacon and navigate according to the information displayed on the dials 30 and 31 of the indicator circuits.

The system 28 is so designed that in the event correct bearing and distance information cannot be obtained, the indicator circuit will enter a "search" condition, whereupon the operator will be unable to derive data. For this purpose, the dial 31 of the range indicator circuit is provided with a distance flag circuit, FIG. 7, which operates a flag 45 for partially hiding the dial of the indicator circuit from the pilots view when the indicator circuit is operating in a "searching" mode. However, when a true bearing is indicated the flag 45 will disappear from view and remain hidden so long as the system 28 is tuned to a valid selected beacon signal.

The basic components, as provided in the range finder, comprise a range modulator MOD, electronic range gate EG, an electronic range control circuit RCC, and an electronic range indicator, FIG. 7.

Range measurement starts with reference pulse generation in an oscillator 46, FIG. 7, in the form of a 4046 c.p.s. (cycle per seconds) sine wave signal. This frequency is chosen because one cycle represents 20 nautical miles in range, and hence serves as a convenient division of the approximate 200 miles distance range of the system.

The 4046-cycle signal is fed to a phase shifting distance measuring resolver DR, which is driven by a servo motor M in the system's range indicator circuit. Simultaneously therewith, the 4046-cycle signal is passed through a pulse former circuit 47 to a coincidence gate circuit 48 arranged in the range finder modulator circuit MOD. A PRF (pulse repetition frequency) multivibrator 49 serves to generate a 300 microsecond gating pulse with an unstable PRF. This gating pulse determines the distance interrogation pulses and is permitted to drift between 120 and 150 p.p.s. (pulses per second) when distance signals are not being detected, or to drift between 22 and 30 p.p.s. when distance reply signals are being detected, i.e., when a "tracking" condition is imposed on the range finder system.

The first 4046-cycle pulse that occurs in the coincidence gate 48 serves to trigger the modulator, which in turn, pulses the system's output R-F circuits for the transmitter 28', FIG. 6, through a pulse transformer 51, FIG. 7, driver 52, and a pulse output transformer 53, to effect a transmission of a pulsed interrogation signal to a selected beacon 29.

The pulse which serves to trigger the modulator, and applied to the unit DR, is used to initiate a variable width gating pulse generated by a phantastron circuit 54. The width of the gating pulse is repeatedly made to increase, viz. made to "search," from 50-microsecond (0 miles) to 2400-microsecond (200 miles) every 20 seconds by a servo motor driven potentiometer disposed in the range indicator, as will hereinafter be more fully described. The trailing edge of the phantastron variable width output pulse determines the start of a selector pulse generated in a selection pulse gate circuit 56.

The phase-shifting distance resolver DR provides a 4046-cycle phase shifted signal from the range indicator, which signal is converted into a series of narrow pulses by a reference pulse generator 57. The first such narrow pulse that is coincident with a selector pulse obtained from the circuit 56 is applied through a coincidence gate 58 and a pulse forming line 58' to an early gate pulse within an early gate circuit 59. The output from the pulse forming line 58' is simultaneously fed to a late gate pulse delay line 61 for initiating a late gate pulse within a late gate circuit 62. The early and late gate circuits utilize pentodes for forming coincident gate circuits.

It is to be understood that the time at which the early gate pulses are initiated is determined primarily by the phantastron circuit delay and the phase-shift of the 4046-cycle pulse of the distance measuring potentiometer DM. Since both the phantastron delay and the 4046-cycle signal phase shift are caused to continuously vary, due to the effect of the multivibrator 49 and the DR circuit, the time positions of the gating pulses are continuously varying relative to transmitter pulses of the transmitter 28′, FIG. 6.

Essentially, the phantastron circuit 54 serves to position the gating pulses of the early and late gate circuits within 20 miles of the correct distance, while the amount of phase shift effected by the DR circuit output signal determines accurately the distance within this 20 mile range.

The gating pulses, from the early and late gates 59 and 62, serve to control the operation of the servo motor M in conjunction with response signals in a manner as will hereinafter be described.

The aforementioned antenna of the airborne system 28 is coupled with an I-F (intermediate frequency) amplifier of the receiver 34, through a transmitter-preselector system, not shown, having conventional components comprising preselector cavities, a crystal mixer, tripler amplifier, amplifier mixer and a first R-F amplifier. The received pulsed signals are fed from the antenna connector through a coaxial cable to a coupling post and from there through the preselctor cavities to the crystal mixer. A 63 mc. pulse output from the crystal mixer is fed directly to the I-F amplifier through a coaxial cable. The I-F amplifier consists of five intermediate frequency amplifying circuits, a discriminator circuit, and one video amplifying circuit which serve to amplify the 63 mc. output signals from the crystal mixer, detect and amplify the video signals to provide for an input to a video decoder VD, FIG. 7, disposed within the receiver system 34, FIG. 6. The over-all intermediate frequency bandwidth is 3 mc. between 3 db (decibel) points. The over-all intermediate frequency gain is 120 db with a noise figure of less than 3 db.

The video decoder VD accepts properly coded signals from the output terminal of the I-F amplifier system and then generates an automatic gain control voltage, detects the composite amplitude modulation, amplifies and limits the reference and distance reply signals, decodes a 15-cycle reference hearing signal for an azimuth gate circuit, and produces an audio tone signal for the beacon identity signal, which is ultimately transmitted to the pilot's headphones or headset 40.

The amplified and limited reply pulses are directed from the video detector VD and applied to control grids of the pentodes of the early and late gate circuits 59 and 62. When the video decoder output pulses coincide with the early gate pulse, the early gate 59 is caused to function for providing an early gate signal. Likewise, the late gate is caused to function, to provide a late gate signal, by the video decoder output pulses. When the gate pulses are spaced at the exact range of the aircraft, the reply pulses from the video decoder VD coincides with the trailing edge of the early gate pulse and the leading edge of the late gate pulse for thus causing both gate circuits 59 and 62 to conduct.

Each o f the gate circuits 59 and 62 is connected with a transformer winding, not shown, so that any pulse developed in either circuit may be applied to its transformer to develop an output pulse across the transformers secondary winding, to initiate pulses, hereinafter referred to as an "early" and "late" coincidence pulse. The coincidence pulses are fed to separate diodes arranged within a differential rectifier 63, FIG. 7, in the electronic range control system.

The opposite ends of the pentode-connected gate circuit transformer windings are connected to one end of a primary pulse transformer, not shown, with the opposite end thereof connected to a positive 300 volts D.C. voltage source. A pulse developed across the primary of this transformer may be due to a condition existing in either or both of the pentodes of the early and late gate circuits 59 and 62. The resulting pulses, commonly referred to as sum pulses, are induced in the secondary windings and are transmitted to memory circuit 64.

The electronic range control system establishes a "search" or "track" condition for the range circuits from the coincident signals obtained from the range gate circuits 59 and 62 and develops voltages to control the range indicator in both "search" and "track" modes.

Each of the diodes of the differential rectifier 63 is caused to conduct as a result of an application of signals applied from the early and late gates. The diodes function in a manner such that when both "early" and "late" coincidence pulses are simultaneously applied to the diodes, their output signals are canceled so that no net change in output voltage is obtained, thus obviating random pulse effects. The diode output currents are integrated, by means of a capacitor not shown, which acts as an essentially linear integrator for the first six pulses applied to the rectifier diodes. When, and only when, at least six coincidence pulses occur in the late gate circuit, will the aforementioned integrator capacitor become charged sufficiently to activate a relay control circuit 65 for causing a "track" condition to be established through a relay activation in a search-track relay 66.

The relay control circuit 65 utilizes a first and second pentode, not shown, one of which is normally cutoff by a fixed negative bias and the other conductive only when the first is cutoff. As the system "searches" for a reply, the time position of the early gate pulse shifts as the phantastron delay and the 4046-cycle reference pulses are varied. "Searching" continues until distance reply pulses occur in the late gate 62, at which time, and in the presence of six diode pulses, the integrator capacitor becomes charged, as aforementioned, for causing the said first relay tube to conduct, whereby the second tube is cutoff. When the second tube of the relay control 65 is cutoff the search-track relay 66 is caused to switch to a "track" position. When the system is in a "tracking" mode the PRF is changed from 150 to 30 pulses per second and the flag circuit is energized so that the flag 45 is raised to permit the pilot to view the aforementioned range indicator dial 31.

The memory circuit 64 utilizes the aforementioned sum pulses to prevent the relay control 65 from switching to "search" immediately upon loss of a "track" signal. When a loss of a "tracking" signal occurs, i.e., upon loss of a coincidence pulse, the memory circuit serves to cause the range indicator circuit and the position of the tracking system to remain fixed for about 10 seconds. If, during this period, a proper "tracking" signal of coincidence pulse does not occur the relay control 65 is again activated and the system re-enters a "search" mode through reactivation of the search-track relay.

The servo motor M of the range indicator is driven through a motor control circuit MCC, FIG. 7. The motor control circuit MCC comprises a rate control circuit 67 having variable impedance tube V506A, one half of a twin triode, FIG. 8, and a motor control amplifier 68 having a twin triode V505, which acts as a push-pull motor control amplifier, the output of which is utilized to drive the servo motor M.

The rate control circuit 67, in effect, forms an electrical bridge circuit having one pair of legs incorporating resistors $RM_1$ and $RM_2$, FIG. 8, junctioning with a reference voltage source, or the output of the memory circuit 64, while the other pair of legs include a resistor $RM_3$ and the variable impedance tube V506A, the grid of which is connected with the output of the differential rectifier circuit 63 at a major node between the differential rectifier circuit and the range indicator system, so that the impedance of the tube is controlled by the output from the differential rectifier circuit. A relay K501, which functions as a part of the search-track relay circuit 66, is energized in the absence of a coincidence pulse and operates an associated switch for grounding the plate of the tube. This condition causes a large unbalance to occur in the bridge circuit and the output, voltage is then applied through a transformer T501 and the amplifier tube V505, to a motor drive transformer T502, FIG. 9, the secondary of which is connected to a control winding CW of the servo motor M. The magnitude and phase of this voltage is dictated by the impedance valve imposed on variable impedance tube of the bridge circuit. A reference winding RW is connected to a 24-volt 380–420 c.p.s. (cycles per second) reference line so that the servo motor M may be controlled in accordance with two voltages. The motor M is adapted to rotate in a first direction when the voltages present in windings RW and CW are in phase, and in an opposite direction when the voltages are out of phase. The motor's speed of rotation is a function of the magnitude of the two voltage valves and will be zero when the driving voltages have combined value of zero. It is to be understood that when the relay K501 is deenergized, in the presence of a coincidence pulse with the system switching a "track" mode, the ground is removed and the degree of unbalance is greatly reduced, for thus reducing the speed of the servo motor M to its tracking rate. For preventing the motor control circuit MCC from oscillating, an induction rate generator RG, which constitutes a portion of the range indicator servo motor circuit as will hereinafter be more fully described, provides a small A.C. (alternating current) voltage of variable frequency. This voltage is amplified and applied to the secondary winding of transformer T501 in such a fashion as to oppose the control voltage to steady the mileage indication.

The range indicator system produces a D.C. voltage proportional to distance, which is fed to the electronic range gate, FIG. 7. The indicator system also accepts the aforementioned 4046-cycle range reference signals from the range gate, as hereinbefore described, shifts the phase of this signal, and feeds it back to the range gate. The aforementioned distance resolver DR, FIG. 7, is driven by the motor rate generator RG for providing an output voltage, which is constant in amplitude but variable in phase with the position of it's rotor, and is utilized by the reference pulse generator 57 to provide the aforementioned phase shifted signals. The rate generator RG is in turn driven by the servo motor M.

A suitable mechanical linkage L, indicated by dotted lines, FIG. 9, serve to couple the servo motor rate generator RG, the distance measuring resolver DR, arms of the distance measuring potentiometer DM, a counter C, and a pair of potentiometer arms 69 and 70 arranged within a pair of distance take-off potentiometer units $DT_1$ and $DT_2$, respectively.

It is to be particularly noted that the arms 69 and 70 are movable along a pair of potentiometer 20 kilohm resistors R1602 and R1603 in accordance with aircraft range with respect to a source of response signals received at the range finder receiver 34. The resistors R1602 and R1603 are connected across the output terminals of a 120 volt D.C. source, whereby as the linkage L serves to drive the potentiometer arms 69 and 70 of potentiometer units $DT_1$ and $DT_2$, an output voltage being propotional to, and increasing with distance is obtainable through the arms 69 and 70. It is to be understood that potentiometers $DT_1$ and $DT_2$ serve to provide an electronic range finder or Tacan output signal for EGS system of the present invention.

In view of the foregoing, it is to be understood that output pulses from the early gate 59 controls the conduction of the first differential rectifier tube, while output pulses from the late gate 62 control conduction of a second differential rectifier tube or diode within the differential rectifier circuit 63. The outputs of these tubes are in opposition so that there will be no control voltage until there is a voltage imbalance at the input of the tubes. Under these conditions, the motor M is driven at "searching" speeds. When a reply signal is received through decoder VD it consistently appears in synchronization with one gate or the other, and if more than six reply pulses are received, the motor speed will be decreased to a "tracking" rate, through the function of the integrator capacitor, when the reply pulses appear in the late gate 59. When tracking on a reply, the servo motor's speed and direction are dictated by the degree of imbalance at the output of the gating circuits. Whether in a "tracking" or "searching" mode or condition, the servo motor M, with its associated rate generator RG, is driven to correct imbalance and maintains the distance measuring potentiometer DM and distance measuring resolver DR in the position that provides the proper phantastron delay and phase shaft. Furthermore, the arms 69 and 70 of the distance take-off potentiometer units $D_1$ and $D_2$ are driven by the linkage L, which is common to the resolver DR and distance measuring potentiometer DM so that an output voltage proportional to distance may be obtained therefrom. These potentiometer units, $DT_1$ and $DT_2$, are considered to be extra potentiometers to be used, where desired, with various computer systems. However, these units are utilized, in the present invention, as means to provide voltages proportional to distance as an input voltage to the EGS or electronic glide slope system.

While certain circuits and sections of the airborne Tacan system have not been described in detail, a detailed description of these sections is not deemed necessary to provide a complete understanding of the claimed invention and have been omitted in interest of brevity, particularly, since Tacan systems are of known design.

*EGS system*

The electronic glide slope system, herein referred to as an EGS system, comprises a basic bridge circuit which serves to combine a continuous electrical output voltage provided from an electronic altimeter with a continuous electrical output voltage provided through an electonic range finder system or Tacan circuit of types hereinabove described, for indicating aircraft approach error with respect to aircraft altitude and range as the aircraft approaches a landing or touchdown along a predetermined glide slope.

The circuit of the EGS system is designed to utilize voltage outputs obtained through the altimeter and the range finder systems' controlled potentiometers in a manner such that an approach along a predetermined glide slope of, for example, 3.5–4.0 degrees will cause the horizontal bar HB, FIG. 2, of the glide slope indicator 10 to remain centered. As the aircraft approaches a landing, deviation from the glide slope will cause the bar HB to depart from its centered position, either up or down, as dictated by approach error. However, it is to be understood that the EGS system is not limited to use with any specific system indicator, but may be used with various signaling devices.

The indicator presently utilized comprises a damped meter, of known design, which permits the horizontal bar HB to alter its position when the voltage values, as applied at the opposite sides thereof, are varied. Such meters are well known and of general design, and for this reason a detailed description thereof is not deemed necessary to provide for a complete understanding of the present invention, and is therefore, omitted in the interest of brevity.

As schematically shown, FIG. 4B, the 50 kilohm potentiometer resistor R806D, hereinabove described as being disposed within the automatic pilot control unit AP, is provided with an arm 71 which is driven by the aforedescribed servo motor 19, through the potentiometer shaft PS, in accordance with aircraft altitude changes so that the voltage output obtained through the arm 71 is caused to vary proportionally with changes occurring in the aircraft's altitude. The resistor R806D is connected in circuit series between a pair of EGS circuit potentiometer resistors R906A and R906B, FIG. 11, having arms 72 and 73 and is so disposed as to be included in a first half of the bridge circuit. The EGS potentiometer resistors R906A and R906B each have a maximum resistance value of 10 kilohms, and may be so adjusted, by positioning their arms 72 and 73, respectively, so as to vary the current flow through the potentiometer resistor R806D for purposes of calibrating the EGS system in order to obtain a predetermined output voltage value from the arm 71 in accordance with the aircraft's altitude, whereupon, the output voltage obtained through arm 71 may be applied to one side of the glide slope indicator 10 through an altimeter voltage output lead AL. Therefore, it is to be understood that ordinarily there is some predetermined voltage value less than 120 volts D.C. applied across the 50 kilohm resistor R806D, however, in operation the effective changes in magnitude of the output voltage primarily depends upon the longitudinal positioning of the arm 71 relative to the potentiometer's resistor R806D. Therefore, as the aircraft's altitude changes, the servo motor 19 is activated by the electronic altimeter in such a manner as to displace the arm 71 along the resistor R806D to vary the voltage output, through the arm 71, from a minimum value up to a maximum value, as dictated by the circuit series connected resistors R906A and R906B. In practice, the arm 71 is displaced from a point representing 200 feet at one end of the resistor through a point representing an altitude of the least 1000 feet above the terrain.

The EGS system, as designed, is presently intended to function within an altitude range extending between 200 feet and 1000 feet. However, it is to be understood that usable glide slope intelligence may be extended to ground level merely by altering the values of the circuit components and adjusting the position of arms 72 and 73 relative to resistors R906A and R906B to vary the voltage values applied across the resistor R806D so as to provide an input voltage to the EGS circuit indicator 10 over an increased range.

As hereinbefore described, the electronic range finder system is provided with a distance take-off potentiometer unit $DT_1$. The distance take-off potentiometer comprises a 20 kilohm resistor R1602 and a displaceable arm 69, which is driven by the servo motor M of the range finder system, in such a manner as to provide a voltage output through the potentiometer arm 69 proportional to aircraft's range from a range finder response signal source. The output obtained through the potentiometer $DT_1$ is imposed on the glide slope indicator 10 through an output lead RL in a manner as to oppose the altimeter's output voltage as it is applied to the indicator.

The potentiometer resistor R1602 is operatively connected with a voltage divider network comprising a 10 kilohm resistor $R_1$ and a 25 kilohm potentiometer resistor $R_1'$ so as to supply an output voltage of determinable value across the range finder potentiometer unit $DT_1$ through an arm 74. The potentiometer $DT_1$ with its associated resistors, is included in a second half of the EGS bridge circuit, which is connected with a 120 volt D.C. source so as to have a predetermined voltage, of a value somewhat less than 120 volts, ordinarily applied across the resistor R1602. Hence, as the range indicator system drives the arm 69 along the resistor R1602 in accordance with its range from the source of the response signals, a proportional voltage is obtained from arm 69 and applied to one side of the indicator 10.

The 120 volts D.C. voltage is connected at $VS_1$ in such a manner as to cause the potentiometer resistor R806D, of the altimeter, and the resistor R1602, of the range finder potentiometer $DT_1$, to be connected within the bridge circuit in circuit parallel with respect to each other, and in circuit series with their respectively associated resistors, so as to comprise adjacent halves of the EGS bridge circuit whereby the D.C. voltage applied to the bridges is applied equally across each half thereof, as more clearly shown in FIGS. 12 and 13.

A positive D.C. voltage source having 120 volts has been selected because of its availability within the associated range finder system. Because of this voltage value, a pair of 5 kilohm voltage dividing resistors $R_2$ and $R_3$ are connected across the parallel circuit and connected with the altimeter output lead AL in order to permit necessary current flow from the range potentiometer unit $DT_1$ through the indicator 10. In the absence of these resistors, the operating voltage would have to be of a significantly higher value, constituting an order not readily available or desirable to use in the intended environment, as these resistors provide constant voltages of low order to the altimeter side of the indicator 10.

During operation, the voltage which is imposed on the indicator 10 through the output leads AL and RL, increases to maximum value when range and altitude are increased to maximum, due to displacement or travel of the potentiometer arms along their associated resistors R806D and R1602. Since the EGS system is intended to function to provide intelligence over ranges including 200–1000 feet altitude, and 0–2.77 miles range, only a portion of the resistors R806D and R1602 is in practice utilized, i.e., the portions which provide voltage values corresponding to the above-mentioned range. However, since the arms 69 and 71 will necessarily be further displaced during operation of the range finder and altimeter, due to a continued activation of their respective servo motors, it is deemed desirable to provide means for preventing the EGS and indicator circuits from being electrically overloaded by increased voltages resulting from continued servo motor activation.

The circuit protection means presently utilized comprises the aforementioned potentiometer resistor R1603, with its associated arm 70, arranged in the potentiometer unit $DT_2$ of the range finder system, and a relay switch circuit, generally designated K, FIG. 11. The resistor R1603 of the unit $DT_2$ is connected with the aforementioned +120 volts D.C. source power supply system of the range finder through the terminal junction or connection $VS_1$. The arm 70 is connected in circuit series with a relay energizing coil KC, through a 3.6 kilohm current limiting resistor $R_4$. The relay K serves to actuate a pair of relay switches $KS_1$ and $KS_2$.

The switch $KS_1$ is normally open, but upon closing connects the EGS indicator flag activating coil 45C′ with a D.C. voltage source so that the flag solenoid may be energized, whereby a flag 45′, of the EGS indicator 10, may be caused to obscure at least a portion of the dial of the indicator when the circuit between the EGS flag activating solenoid and the voltage source is closed.

A second relay operated switch $KS_2$ serves, simultaneously, to close a circuit between the negative side of the EGS bridge circuit and a second +120 volts D.C. source. The second D.C. source may be disposed in the range finder power supply unit, and connected at $VS_2$ so as to substantially reduce the potential across the bridge circuit when the switch $KS_2$ is closed.

In order for the relay K to function, it is necessary for the voltage from the power source terminal $VS_1$, as applied through the potentiometer arm 70 of the potentiometer $DT_2$ and the resistor $R_4$, to increase to a sufficient operating value for causing the relay coil KC to become operatively energized. When the coil KC is operatively energized, the switches $KS_1$ and $KS_2$ are closed in a simultaneous fashion so as to complete the flag activating circuit for the flag solenoid 45C′ of the EGS system, and to complete the circuit between the negative voltage side of the parallel EGS circuit and the second +120 volts D.C. source, for thus obscuring the dial of indicator 10 and substantially reducing the potential across the EGS bridge circuit. Hence, it is to be understood that, in operation, when the aircraft range is greater than 2.77 miles, and the altitude is greater than 1000 feet, a voltage will be imposed across the coil of the solenoid KC of sufficient value for causing the solenoid to become energized to thus effect a closing of the switches $KS_1$ and $KS_2$, whereupon the EGS flag 45' will be activated for obscuring the dial of the indicator 10 and the potential across the EGS bridge circuit will be reduced to an effectively "safe" value. When the aircraft again approaches an altitude within the above described ranges the system will become activated upon the voltage applied across the solenoid coil KC being reduced, through displacement of the arm 70 as initiated by the range indicator servo motor M, so that the switches $KS_1$ and $KS_2$ are again opened, whereupon intelligence may be again derived from the EGS system in normal fashion for guiding the aircraft along a predetermined EGS profile.

While the potentiometer of the altimeter's automatic pilot control unit AP functions quite satisfactorily when connected in series with the EGS resistors R906A and R906B as illustrated in FIG. 12, it is contemplated that in some instances it may be found desirable to provide yet a finer control for the voltage imposed across the resistor R806D. To effect such control, the 10 kilohm resistors R906A and R906B may be replaced by a plurality of resistors including a pair of resistors R907A and R907B having lesser values, FIG. 13. For example, each of the 10 kilohm resistors R907A and R907B may be of a 500 ohms type and be connected in circuit series with resistors values. The resistors R907A and R907B may be connected in circuit series with additional current limiting resistors $R_{11}$, $R_{12}$ and $R_{13}$. The resistors R907A and R907B are connected at their outer ends to the current limiting resistors $R_{11}$ and $R_{12}$, respectively, while the inner ends of the potentiometers R907A and R907B are connected through the resistor $R_{13}$. As designed for use with potentiometer resistors R907A and R907B, the resistor $R_{11}$ may be given a value of 5 kilohms, the resistor $R_{12}$ given a value of 6.8 kilohms, and the resistor $R_{13}$ 7.2 kilohms. Therefore, it is to be understood that by providing a plurality of circuit series resistors of lesser value, the potentiometer resistors R907A and R907B may be provided for accommodating finer control in the voltage values imposed across the potentiometer resistor R806D, and consequently, the voltage supplied to the indicator 10 may be controlled with greater accuracy, to thus increase the efficiency of the EGS system.

A test circuit for calibrating the EGS system is incorporated with the EGS system and may, if desired, be formed as a seaparate unit of test harness to facilitate testing the EGS systems of several aircraft.

A test circuit, FIG. 14, utilizing an ampmeter 80, is so designed as to permit an EGS system circuit current to pass through the meter 80, and is provided with a plurality of EGS circuit connecting terminals A, B, C, D, E, F, G, and H.

It is intended that the meter 80 be connected in circuit series with a one kilohm variable resistor $R_{TP}$ having associated therewith on an adjustable arm 81, a 16.5 kilohm resistor $R_{20}$, and a switch $PB_1$. An additional switch $PB_2$, and a meter operating switch $PB_3$, for opening and closing the test circuit is provided for purposes as will hereinafter become more readily understood. Additional resistors, comprising a pair of 10 kilohm resistors $R_{21}$ and $R_{22}$, are connected between test circuit terminals B, C and G, F, respectively.

The EGS system is calibrated and adjusted in the following manner:

First, the arm 74 of the potentiometer resistor $R_1'$ is moved to one end of the resistor to in effect short the arm to one end thereof. The range potentiometer arm 69 is now disconnected from the indicator 10. With the arms 69 and 74 in this condition, the parallel resistors R1602 and $R_1'$ are connected into the test circuit between the terminals A and B. A +120 volts D.C. current is now applied across terminals A and C. The arm 74 is now adjusted along resistor $R_1'$ until a zero reading is obtained at the meter 80. The arm 74 is now locked in this position, by any suitable means. The EGS circuit and test circuit are now disconnected and reconnected as follows: the paralleled potentiometer resistors A1602 and $R_1'$ are disconnected from terminals A and B and reconnected with the test circuit at terminals H and F, FIG. 15; the disconnected potentiometer arm 69 is now connected to the terminal E, and the 5 kilohm resistor $R_2$ connected to terminal H, while the resistor $R_3$ is connected to test circuit terminal G. The resistors R906A, R906B and R906D must be connected to terminal H, and the arm 71 of the altimeter's automatic pilot potentiometer connected at terminal D. With the test circuit and the EGS system thus connected, FIG. 15, the electronic range finder system, or at least the arm 69 of the potentiometer unit $DT_1$, is adjusted to a zero mile position, and the electronic altimeter system, or at least the potentiometer of unit AP, is adjusted to a 200 feet altitude position, assuming that the EGS is intended to function at a minimum altitude of 200 feet.

A positive 120 volt D.C. voltage is now applied to the test circuit at terminal H, while the negative polarity is applied at terminal G. It now becomes necessary to adjust the arm 73 with respect to resistor R906B until a meter reading of zero is obtained when switch $PB_2$ is closed. At this time the altimeter and/or the arm of the altimeter potentiometer unit AP is again adjusted, this time to a 1000 feet, assuming 1000 feet is the upper operative limit of EGS system. Adjustment of the arm 72 relative to the resistor R906A is now required to provide a necessary 150 microampere reading on the meter 80. With the altimeter circuit thus adjusted, the arm 69 of the range finder systems potentiometer is now adjusted to a 2.77 miles position to establish the maximum range position of thte EGS system, whereupon depression of test set switch $PG_2$ will provide a meter value of zero. With the circuit thus calibrated, the settings are returned to a zero value before sending the aircraft aloft.

It is to be particularly noted that adjustment of arm 74 will not appreciably effect the glide slope indication, but does effect aircraft position relative to the range at which the 200 feet altitude point is reached, and for this reason the arm 74 may be positioned for various ranges, for example, one-half mile for 200 feet altitude.

*Operation*

With the EGS system calibrated, as hereinabove described, an electronic range finder system of a piloted airborne aircraft may be tuned to a shipboard or landing-strip response signal source or beacon 29. The EGS flag 45' normally covers a portion of the dial 10 when the aircraft is beyond operative range/altitude, due to the function of the relay $K_1$.

At a marshal point typically at 20–30,000 feet altitude and 15–30 nautical miles from the ship, the aircraft pilot will cause the aircraft to descend at a decreasing rate varying from 4000 ft./min. (feet per minute) to 2000 ft./min. to an altitude of 2000 feet at a range of approximately 10 nautical miles, the aircraft may now approach the ship at this altitude to a point approximately six nautical miles from the ship, at which time the pilot descends to an altitude of 1000 feet, FIG. 1, along a glide slope path at 3.5 to 4.0 degrees till the horizontal bar of his EGS indicator 10 is activated and centered, with the flag 45' removed from the dial of the indicator. This indicates aircraft interception of the EGS glide path profile. Upon activation of the EGS circuit, the opposing voltages as dictated by the servo motor displacement of the arms 69 and 71 of the aforedescribed potentiometers of the altimeter and range finder systems, is applied at opposite sides of the indicator 10.

As long as the aircraft's altitude and range coincide, in a predetermined manner, the horizontal bar HB will remain centered, due to a balanced voltage condition existing across the indicator 10. However, if the aircraft's altitude is caused to vary, as the aircraft varies from the predetermined path, the resistance across resistor R806D is varied accordingly, through the displacement of the potentiometer arm 71 by the servo motor 19, and since the resistance across the potentiometer resistor R1602 is changing at a constant rate, due to the constant displacement of arm 69 by servo motor M and the rate generator RG, a voltage imbalance occurs across the meter, or indicator, 10 for causing the bar HB to be displaced proportionally with the magnitude of voltage imbalance, thus providing an error indication, which may be corrected by varying the aircraft's altitude to again establish a voltage balance across the indicator 10. Hence, it is to be understood that the pilot need merely fly down the predetermined slope in a manner such as is necessary to maintain an equal voltage input at each side of the indicator 10. Since the altimeter and range finder are driven in accordance with altitude and range variations, the altitude and range controlled voltages remain equal so long as the aircraft remains at a predetermined altitude for the predetermined range from the landing area. Deviation fom the predetermined glide slope causes the horizontal bar HB to vary up or down in accordance with voltage imbalance for thus providing error intelligence so that the pilot may adjust the aircraft's position relative to the ship or touchdown area, to correct the indicated error. At minimum range and altitude, or point TP, the pilot transfers his attention to an optical landing system presentation and completes the aircraft landing operation in a conventional manner.

In view of the foregoing description of the present invention, it is to be understood that there has been provided a modified electrical bridge circuit, which combines aircraft altitude and range intelligence, as derived from existing systems presently installed in most modern aircraft. The circuit thus provides a simplified and readily operable device, which aids in eliminating pilot error during aircraft recovery procedures. In effect, the EGS system serves to provide a predetermined glide slope as an extension of the optical landing system glide slope, ordinarily a slope of three and one-half to four degrees.

In certain instances, existing distance measuring indicators, or range finder systems and existing electronic altimeter systems may have component values which vary somewhat from those hereinabove described, however, it is entirely feasible to alter the values of the necessary components in accordance with the foregoing teaching for thus providing a properly adjusted EGS circuit.

Obviously many modifications and variations of the present invention are possible in the light of the above teachings. It is therefore to be understood that within the scope of the appended claims the invention may be practiced otherwise than as specifically described.

What is claimed is:

1. In an aircraft electronic glide slope system comprising in combination:
- a first reference voltage connected potentiometer having at least one driven arm;
- means for driving said arm of said first potentiometer in accordance with aircraft altitude for providing a first voltage input signal indicative of aircraft altitude;
- a second reference voltage connected potentiometer having at least one driven arm;
- means for driving said arm of said second potentiometer in accordance with aircraft range with respect to a preselected aircraft touchdown point to provide a second voltage input signal indicative of aircraft range from said touchdown point;
- an electrical bridge circuit;
- means for connecting said first and said second potentiometers at opposite sides of the bridge circuit; and
- signal detector means connected across said bridge whereby voltage imbalance occurring across said bridge may be detected and presented as error with respect to a predetermined glide slope profile.

2. The system defined in claim 1, wherein the indicator connected with said bridge provides a visual error display.

3. A vehicle guidance system for indicating vertical error with respect to a predetermined glide slope profile comprising in combination:
- an electrical bridge circuit including at least a first potentiometer and potentiometer output means, and a second potentiometer and potentiometer output means so disposed as to be arranged at opposite sides of the bridge circuit;
- means for providing a reference voltage across the first and second potentiometers of said bridge circuit;
- an electronic altimeter having means for continuously varying output voltages from said first potentiometer to provide a first voltage value in accordance with the vehicle's altitude;
- an electronic range finder having means for continuously varying output voltages from said second potentiometer to provide a second voltage value in accordance with the vehicle's range with respect to a preselected vehicle touchdown area;
- voltage comparing and indicating means connected within said bridge circuit; and
- means for connecting said comparing and indicating means with said first and said second potentiometers of said bridge circuit in a manner such that the output voltages of said first and said second potentiometers may be continuously compared, whereby voltage imbalance occurring between the first and second voltage values applied to said bridge circuit may be utilized by said comparing and indicating means to indicate vehicle position error with respect to said profile.

4. The system of claim 3, further including:
- a pair of voltage dividing resistors connected with the potentiometer output means of the first potentiometer, and in circuit parallel with said first potentiometer so that said bridge circuit may accommodate voltages of an optimum value.

5. The system of claim 3 wherein the means for varying the output voltages from said first potentiometer includes an altimeter servo motor connected with said first potentiometer, and the means for varying the voltages from said second potentiometer in accordance with aircraft range includes a range finder servo motor connected with said second potentiometer.

6. A bridge circuit for comparing voltage output values from electronic altimeter system with voltage output values from an electronic range finder system, comprising in combination:
- a first and a second bridge circuit resistor;
- an altimeter controlled potentiometer;
- adjustable connecting means for joining said altitude controlled potentiometer with said first and second bridge circuit resistors in such a manner that a reference voltage as applied across said altitude controlled potentiometer may be dictated by positioning said adjustable connecting means;
- means disposed within said altimeter for driving said potentiometer so as to provide a voltage output therefrom is in accordance with altitude intelligence as determined by said altimeter;
- a range finder controlled potentiometer disposed said range finder system;
- means for applying a reference voltage across said range controlled potentiometer;
- means for adjusting the value of said reference voltage as it is applied to said range finder controlled potentiometer;

means for driving said range finder controlled potentiometer so as to provide a voltage output therefrom in accordance with aircraft range intelligence as determined by said range finder; and means to compare the voltage output from said altimeter controlled potentiometer and said range finder controlled potentiometer so that the altimeter output voltage and the range finder output voltage may be continuously compared, whereby error intelligence with respect to a predetermined altitude and range relationship may be continuously determined.

7. A system for providing aircraft error intelligence with respect to a predetermined glide slope profile comprising in combination:

means for providing a voltage output indicative of aircraft altitude;

means for providing a voltage output indicative of aircraft range from a preselected touchdown area;

wherein the means for providing voltage outputs indicative of aircraft altitude and range includes at least a pair of potentiometers each having a servo motor driven arm;

means for imposing a constant reference voltage across each of the potentiometers; and means for comparing the output voltages and providing an error signal indicative of aircraft disposition with respect to said profile.

8. A system for providing aircraft error intelligence with respect to a predetermined glide slope profile comprising in combination:

means for providing a voltage output indicative of aircraft altitude;

means for providing a voltage output indicative of aircraft range from a preselected touchdown area;

wherein the means for providing voltage outputs indicative of aircraft altitude and range includes at least a pair of potentiometers each having a servo motor driven arm;

means for imposing a constant reference voltage across each of the potentiometers; and means for comparing the output voltages and providing an error signal indicative of aircraft disposition with respect to said profile;

wherein the means for comparing the output voltages includes a potentiometer connected electrical bridge circuit with a voltage indicator connected thereacross, whereby imbalance between the output voltages serves for driving the indicator coextensively with voltage imbalance.

9. A system for determining an airborne aircraft's altitude error with respect to its range from a predetermined point comprising, in combination:

an electronic altimeter for transmitting electronic signals from said aircraft to ground level and receiving reflected pulses therefrom for determining aircraft altitude;

an electronic pulse transmitting beacon for transmitting pulsed response signals;

an electronic range finder system for transmitting interrogating signals to said beacon for initiating said response signals from said beacon so that the aircraft's range from said beacon may be determined; and an electronic glide slope system for interconnecting the electronic altimeter and electronic range finder in such a manner as to provide error intelligence with respect to the aircraft's altitude and range as the aircraft approaches a landing along an aircraft approach profile;

wherein the electronic glide slope system includes:

a first potentiometer having at least one arm driven by said electronic altimeter system in accordance with aircraft altitude;

a second potentiometer having at least one arm driven by said electronic range finder system in accordance with the aircraft range;

means for imposing a voltage of equal value across said first and second potentiometers to provide a pair of potentiometer output voltage signals indicative of aircraft altitude and range;

a bridge circuit for interconnecting said first and said second potentiometers, whereby the potentiometer output voltage signals may be compared; and a voltage indicating means connected within said modified bridge circuit so that voltage imbalance between the potentiometer output voltage signals may be detected, whereby the aircraft's altitude may be varied to conform to the predetermined altitude and range relationship.

10. A system for indicating an airborne aircraft's relative position with respect to a predetermined glide slope profile, comprising in combination:

means for providing an electrical signal indicative of aircraft altitude above a given designed area;

means for providing an electrical signal indicative of aircraft range from said designated area;

means for combining and comparing said electrical signals to provide a single output signal indicative of relative position with respect to said profile;

wherein the means for combining and comparing said electrical signal comprises:

an altimeter potentiometer resistor arranged in a first branch of a modified bridge circuit;

a displaceable potentiometer arm being so arranged as to be driven along said altimeter resistor in accordance with the aircraft's altitude above said area;

connecting means for connecting a source of positive reference voltage of predetermined value across said potentiometer resistor;

a range finder potentiometer resistor arranged in a second branch of said modified bridge circuit;

a displaceable potentiometer arm being so arranged as to be driven along said range finder resistor in accordance with the aircraft's range from said area;

connecting means for connecting said predetermined reference voltage source across said range finder resistor; and a voltage detector connected across the arms of said potentiometers for detecting electrical imbalance between the arms of said potentiometers, whereby detected electrical imbalance may be utilized as aircraft position error with respect to said profile.

11. The system of claim 10 wherein at least a single potentiometer resistor is provided in circuit series with said altimeter potentiometer resistor and with said range finder potentiometer so that the reference voltage values may be adjusted to just cancel each other to provide a resultant bridge output voltage of zero value when the aircraft is at a desired altitude for a predetermined range.

12. The system as defined in claim 11 wherein there is provided:

a second range finder potentiometer resistor having at least one arm thereof driven along said resistor in accordance with aircraft range from said designated area;

means connecting said second range finder potentiometer resistor in circuit parallel with said first range finder potentiometer;

a second positive voltage source;

means including a relay activated switch for connecting said second voltage source to a normally negative side of said modified bridge circuit;

a relay energizing solenoid coil connected in circuit series with said arm of said second range finder potentiometer, whereby as the aircraft's range increases said relay solenoid coil experiences an increase in voltage drop thereacross;

a detector flag activating solenoid coil; and means including a normally open relay activated switch for connecting said detector flag activation solenoid coil in circuit series with said second range finder potentiometer, whereby when a predetermined voltage drop occurs across said solenoid coil said relay solenoid coil becomes energized for simultaneously closing the circuit between said second voltage source and the normally negative side of said modified bridge circuit and the detector flag solenoid coil, so that significant voltage drop across said modified bridge circuit is obviated and simultaneously therewith the detector flag is activated to obscure the detector.

References Cited by the Examiner

UNITED STATES PATENTS

| | | | |
|---|---|---|---|
| 2,604,621 | 7/1952 | Earp et al. | 343—108 |
| 2,871,470 | 1/1959 | Stephenson | 343—108 |
| 3,130,401 | 4/1964 | Murphy | 343—6 |
| 3,181,153 | 4/1965 | Cella | 343—108 |
| 3,230,527 | 1/1966 | Wehde et al. | 343—6 |

RODNEY D. BENNETT, *Acting Primary Examiner.*

CHESTER L. JUSTUS, *Examiner.*

P. M. HINDERSTEIN, D. C. KAUFMAN, *Assistant Examiners.*